United States Patent
Kishi et al.

(10) Patent No.: US 9,362,809 B2
(45) Date of Patent: Jun. 7, 2016

(54) STATOR FOR ELECTRIC ROTARY MACHINE AND FABRICATING METHOD OF THE SAME

(75) Inventors: Takeki Kishi, Saitama (JP); Tomotaka Iki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 269 days.

(21) Appl. No.: 13/553,494

(22) Filed: Jul. 19, 2012

(65) Prior Publication Data

US 2013/0020891 A1 Jan. 24, 2013

(30) Foreign Application Priority Data

Jul. 21, 2011 (JP) ................................. 2011-160218
Jul. 21, 2011 (JP) ................................. 2011-160219
Jul. 21, 2011 (JP) ................................. 2011-160222

(51) Int. Cl.
*H02K 15/04* (2006.01)
*H02K 3/12* (2006.01)
*H02K 3/28* (2006.01)
(Continued)

(52) U.S. Cl.
CPC .............. *H02K 15/0414* (2013.01); *H02K 3/12* (2013.01); *H02K 3/28* (2013.01); *H02K 3/345* (2013.01); *H02K 3/50* (2013.01); *H02K 9/22* (2013.01); *Y10T 29/49071* (2015.01)

(58) Field of Classification Search
CPC ....... H02K 15/0025; H02K 3/12; H02K 3/28; H02K 3/34; H02K 3/345; H02K 3/50; H02K 9/22; H02K 15/0414
USPC ................................. 310/71, 201, 215, DIG. 6
See application file for complete search history.

(56) References Cited

U.S. PATENT DOCUMENTS 4,321,497 A * 3/1982 Long .................... H02K 3/12
                                                  310/198
5,422,526 A * 6/1995 Kawabata ............ H02K 3/12
                                                  310/201
(Continued)

FOREIGN PATENT DOCUMENTS

EP      1 265 341 A1    12/2002
JP      59-73279 A       5/1984
(Continued)

OTHER PUBLICATIONS

Office Action dated Oct. 21, 2014, issued in corresponding Japan Patent Application No. 2011-160222.
(Continued)

*Primary Examiner* — Joshua Benitez-Rosario
*Assistant Examiner* — Rashad Johnson
(74) *Attorney, Agent, or Firm* — Squire Patton Boggs (US) LLP

(57) ABSTRACT

One embodiment provides a stator for an electric rotary machine, the stator including: a stator core having plural slots; segmented coils of plural phases; and a pair of base plates provided at both ends of the stator core, wherein the segmented coils have plural substantially-straight coil bars which are respectively inserted in the slots in the stator core and plural connection coils which are disposed on the base plates so as to connect together the coil bars of the same phase, and wherein the stator core and the coil bars make up a stator core assembly and the base plates and the connection coils make up base plate assemblies, so that the stator is made up of the stator core assembly and the base plate assemblies.

15 Claims, 16 Drawing Sheets

(51) Int. Cl.
  *H02K 3/34*   (2006.01)
  *H02K 3/50*   (2006.01)
  *H02K 9/22*   (2006.01)

(56) References Cited

U.S. PATENT DOCUMENTS

| | | | | |
|---|---|---|---|---|
| 5,616,977 | A * | 4/1997 | Hill | H02K 3/12 |
| | | | | 29/596 |
| 5,773,905 | A * | 6/1998 | Hill | H02K 1/06 |
| | | | | 310/179 |
| 5,804,902 | A * | 9/1998 | Hill | H02K 3/12 |
| | | | | 310/116 |
| 6,181,043 | B1 * | 1/2001 | Kusase et al. | 310/201 |
| 6,400,059 | B1 * | 6/2002 | Hsu | 310/254.1 |
| 6,700,282 | B2 * | 3/2004 | Mori et al. | 310/208 |
| 6,856,063 | B1 * | 2/2005 | Kelecy | H02K 3/04 |
| | | | | 29/596 |
| 6,870,294 | B2 * | 3/2005 | Holzheu | H02K 3/12 |
| | | | | 310/201 |
| 6,894,417 | B2 | 5/2005 | Cai et al. | |
| 6,958,561 | B2 * | 10/2005 | Liao | 310/179 |
| 7,402,925 | B2 * | 7/2008 | Best et al. | 310/68 C |
| 8,736,127 | B2 * | 5/2014 | Schlote | H02K 3/12 |
| | | | | 29/596 |
| 2005/0012423 | A1 | 1/2005 | Yasuhara et al. | 310/201 |
| 2006/0261691 | A1 * | 11/2006 | Minke et al. | 310/71 |
| 2007/0052315 | A1 * | 3/2007 | Grundl et al. | 310/207 |
| 2007/0273218 | A1 | 11/2007 | Atkinson | |
| 2008/0143203 | A1 * | 6/2008 | Purvines et al. | 310/71 |
| 2010/0001610 | A1 * | 1/2010 | Iki et al. | 310/208 |
| 2011/0285224 | A1 * | 11/2011 | Iki et al. | 310/64 |
| 2013/0200743 | A1 * | 8/2013 | Okimitsu | 310/201 |
| 2014/0319960 | A1 * | 10/2014 | Iki | H02K 3/12 |
| | | | | 310/216.115 |

FOREIGN PATENT DOCUMENTS

| | | |
|---|---|---|
| JP | 08-182266 A | 7/1996 |
| JP | 2001-275288 A | 10/2001 |
| JP | 2003-158840 | 5/2003 |
| JP | 2006-141076 A | 6/2006 |
| JP | 2006-158044 A | 6/2006 |
| JP | 2008-259383 A | 10/2008 |
| JP | 2009-118660 A | 5/2009 |
| JP | 2010-161928 A | 7/2010 |
| WO | WO 2010067710 A1 * | 6/2010 |

OTHER PUBLICATIONS

Office Action dated Oct. 21, 2014, issued in corresponding Japan Patent Application No. 2011-160219.
Office Action dated Oct. 6, 2015, issued in corresponding DE Application No. 10 2012 212 693.7.
Japanese Office Action application No. 2011-160218 dated Jun. 11, 2013.

* cited by examiner

STATOR FOR ELECTRIC ROTARY MACHINE AND FABRICATING METHOD OF THE SAME

CROSS-REFERENCE TO RELATED APPLICATION(S)

This application claims priorities from Japanese Patent Application Nos. 2011-160218 filed on Jul. 21, 2011, 2011-160219 filed on Jul. 21, 2011, and 2011-160222 filed on Jul. 21, 2011, the entire contents of which are incorporated herein by reference.

FIELD

The present invention relates to a stator for an electric rotary machine which is installed in an electric vehicle or a hybrid vehicle and a fabrication method of the same stator.

BACKGROUND

Conventionally, in one type of stators for electric rotary machines, coils are fabricated by winding windings around teeth of a stator core. In another type of stators, coils are formed by inserting plural segments each made up of an electric conductor which is formed into a U-shape using segment coils in slots in a stator core, and thereafter bending leg portions and connecting end portions of the segments (refer to JP-2003-158840-A and U.S. Pat. No. 6,894,417-B, for example).

However, for winding windings around teeth of a stator core to fabricate coils, expensive exclusive devices such as a winding machine or an inserter are required.

In JP-2003-158840-A and U.S. Pat. No. 6,894,417-B, the coil is formed by forming the electric conductors into the U-shape, bending the leg portions and connecting (welding) the end portions of the segments together. The same number of electric conductors as the numbers of turns of the windings and pairs of poles need to be prepared, and as the numbers of turns of the windings and pairs of poles increase, the number of manhours to be spent for the forming, bending and connecting work increases. Moreover, each of the forming, bending and connecting work is executed for each electric conductor. Thus, it could be further optimized in view of production efficiency.

On the other hand, these electric rotary machines are heated as a result of operation, and therefore, have to be cooled by means of air cooling, water cooling, oil cooling, etc.

In an air cooling, heat is dissipated into the air from heat dissipating fins which are provided on a housing of an electric rotary machine, and the resulting cooling performance is not so high. In electric rotary machines which are installed in motor vehicles, from the reason that a high cooling performance can be attained by cooling coils directly, an oil cooling may be adopted in which, for example, an insulation oil such as an ATF is sprayed directly to a stator and/or a rotor of the electric rotary machine so as to cool them. However, in the oil cooling, the reduction in insulation properties may be caused by water contained in the insulation oil, copper may be attacked by the insulation oil, and the torque of the rotor may be lost by virtue of viscosity resistance produced by the insulation oil.

In a water cooling in which, for example, the electric rotary machine is cooled via the stator core, the heat dissipating path may become long and the heat resistance may not be suppressed. Thus, a desired cooling performance may not be obtained. Additionally, in another type of water cooling in which a water jacket is disposed at coil spanning portions, the similar problem may be caused due to a small contact area with conductors.

Moreover, in the conventional electric rotary machines in which the coils are fabricated by winding the windings around the teeth of the stator core, the winding operation becomes complex and troublesome since the windings are wound while inserting insulation papers so as to be held between the windings so wound, and thus, the insulation paper may be caught between the winding wound, whereby a proper insulating performance cannot be ensured.

In JP-2003-158840-A and U.S. Pat. No. 6,894,417-B, since the U-shaped electric conductor is inserted in the slot after the insulation paper is inserted therein, the electric conductor may come into contact with the insulation paper when the electric conductor is so inserted, and the insulation paper may be caught between the electric conductor and the slot, whereby a proper insulating performance cannot be ensured.

Further, in the conventional electric rotary machines, since an insulation coating material such as enamel which is coated on the winding is used at least partially, it could be further optimized in view of the insulation performance.

SUMMARY

One object of the invention is to provide a stator for an electric rotary machine which can be built up without using exclusive equipment and which has superior mass-production properties and a fabrication method of the same.

Another object of the invention is to provide a stator for an electric rotary machine which can cool coils efficiently without affecting the electric rotary machine.

Still another object of the invention is to provide a stator for an electric rotary machine which has superior insulation properties.

Claim 1 provides a stator (e.g., a stator 10 in embodiment) for an electric rotary machine, the stator including:
a stator core (e.g., a stator core 21 in embodiment) having plural slots (e.g., slots 23 in embodiment);
segmented coils (e.g., coils 50 in embodiment) of plural phases; and
a pair of base plates (e.g., base plates 31L, 31R in embodiment) provided at both ends of the stator core,
wherein the segmented coils have
plural substantially-straight coil bars (e.g., coil bars 25 in embodiment) which are respectively inserted in the slots in the stator core and
plural connection coils (e.g., connection coils 40 in embodiment) which are disposed on the base plates so as to connect together the coil bars of the same phase to thereby make up spanning portions of the segmented coils, and
wherein the stator core and the coil bars make up a stator core assembly (e.g., a stator core assembly 20 in embodiment) and the base plates and the connection coils make up base plate assemblies (e.g., base plate assemblies 30L, 30R in embodiment), so that the stator is made up of the stator core assembly and the base plate assemblies which are disposed at both ends of the stator core assembly.

Claim 2 provides, based on Claim 1, the stator,
wherein the coil bars and the connection coils are connected together by being press fitted or crimped together at both end portions thereof.

Claim 3 provides, based on Claim 1, the stator,
wherein the coil bars and the connection coils are connected together by being press fitted and crimped together at both end portions thereof.

Claim 4 provides, based on Claim 3, the stator,
wherein tapered portions (e.g., tapered portions 26b in embodiment) are formed at both end portions of each coil bar, and tapered holes (e.g., connection holes 43a, 44a in embodiment) adapted to be fitted on the tapered portions are formed in the connection coils, and wherein the coil bars and the connection coils are respectively joined to each other simultaneously by press fitting the tapered portions in the tapered holes and thereafter crimping distal ends of the tapered portions by crushing them to be deformed.

Claim 5 provides, based on Claim 1, the stator, wherein the connection coils are disposed to at least partially in a region where the stator core is projected in an axial direction.

Claim 6 provides a fabrication method of a stator (e.g., the stator 10 in embodiment) for an electric rotary machine, the stator including:

a stator core (e.g., the stator core 21 in embodiment) having plural slots (e.g., the slots 23 in embodiment);

segmented coils (e.g., the coils 50 in embodiment) of plural phases; and a pair of base plates (e.g., the base plates 30L, 30R in embodiment) which are provided at both ends of the stator core, wherein the segmented coils have plural substantially-straight coil bars (e.g., the coil bars 25 in embodiment) which are respectively inserted in the slots in the stator core and plural connection coils (e.g., the connection coils 40 in embodiment) which are disposed on the base plates so as to connect together the coil bars of the same phase to thereby make up spanning portions of the segmented coils, the fabrication method including:

forming a stator core assembly (e.g., the stator core assembly 20 in embodiment) by respectively inserting the coil bars in the slots in the stator core;

forming base plate assemblies (e.g., the base plates 30L, 30R in embodiment) by disposing the connection coils on the base plates; and assembling the base plate assemblies to both axial ends of the stator core assembly.

Claim 7 provides, based on Claim 6, the method,
wherein, in the assembling step, the coil bars and the connection coils are connected together by being press fitted or crimped together at both end portions thereof.

Claim 8 provides, based on Claim 6, the method,
wherein, in the assembling step, the coil bars and the connection coils are connected together by being press fitted and crimped together at both end portions thereof.

Claim 9 provides, based on Claim 8, the method,
wherein tapered portions (e.g., the tapered portions 26b in embodiment) are formed at both end portions of each coil bar, and tapered holes (e.g., the connection holes 43a, 44a in embodiment) adapted to be fitted on the tapered portions are formed in the connection coils, and wherein, in the assembling step, the coil bars and the connection coils are respectively joined to each other simultaneously by press fitting the tapered portions in the tapered holes and thereafter crimping distal ends of the tapered portions by crushing them to be deformed.

According to Claim 1, there is no need to wind windings around the stator core as done in the conventional stator, and the stator can be fabricated without using expensive exclusive equipment such as a winding machine and an inserter, thereby suppressing equipment costs. Compared with the conventional coil fabrication process using the U-shaped segments in which the U-shape forming step, the leg bending step and the end portion joining step are executed at each location, the coil bars and connection coils can be joined together simultaneously at one time, thereby fabricating the stator easily.

According to Claims 2 and 3, the coil bars and the connection coils are connected together through a single assembling step, thereby enhancing the fabrication efficiency.

According to Claim 4, the coil bars and the connection coils can be centered easily, and the connection of the coil bars and the connection coils through crimping can be executed simultaneously at one time, thereby enhancing the fabrication efficiency.

According to Claim 5, the radial size of the stator can be reduced. According to Claim 6, the conventional stator fabrication process can be simplified, thereby fabricating the stator easily and efficiently.

According to Claims 7 and 8, the coil bars and the connection coils can be connected together through a single assembling step, thereby enhancing the fabrication efficiency.

According to Claim 9, the coil bars and the connection coils can be centered easily, and the connection of the coil bars and the connection coils through crimping can be executed simultaneously at one time, thereby enhancing the fabrication efficiency.

Claim 10 provides, based on Claim 1, the stator,
wherein the spanning portions are at least partially exposed to axial end faces (e.g., outer surfaces 35 in embodiment) and are formed flush with the axial end faces, and wherein a cooling plate (e.g., a cooling plate 60 in embodiment) is provided on an outer side of at least one of the base plates so as to be in surface contact with the exposed spanning portions directly or indirectly.

Claim 11 provides, based on Claim 10, the stator,
wherein the coil bars each includes a radially outer coil bar (e.g., a radially outer coil bar 26 in embodiment) and a radially inner coil bar (e.g., a radially inner coil bar 27 in embodiment), which are aligned in a radial direction, wherein the connection coils each includes an inner connection coil (e.g., inner connection coil 42 in embodiment) and an outer connection coil (e.g., an outer connection coil 41 in embodiment) which are disposed in different axial positions, wherein the base plates each have plural grooves (e.g., outer surface grooves 37 and inner surface grooves 38 in embodiment) which are formed on an outer surface (e.g., the outer surface 35 in embodiment) and an inner surface (e.g., an inner surface 36 in embodiment) thereof which are opposite from each other, wherein the outer connection coils are disposed in the grooves (e.g., the outer surface grooves 37 in embodiment) which are formed on the outer surfaces and the inner connection coils are disposed in the grooves (e.g., the inner surface grooves 38 in embodiment) which are formed on the inner surfaces, and wherein one of the radially outer coil bar and the radially inner coil bar is connected to the outer connection coil at one end and is connected to the inner connection coil at the other end, and the other of the radially outer coil bar and the radially inner coil bar is connected to the inner connection coil at one end and is connected to the outer connection coil at the other end.

According to Claim 10, the contact area between the spanning portions (the connection coils) and the cooling plate can be increased to thereby efficiently cool the stator and to enhance efficiency of the electric rotary machine. By water cooling the stator with the cooling plate, it is possible to avoid the oil cooling in which the reduction in insulation properties may be caused by water contained in the insulation oil, in which copper may be attacked by the insulation oil, and in which the torque of the rotor may be lost by virtue of viscosity resistance produced by the insulation oil.

According to Claim 11, the radially outer coil bars and the radially inner coil bars are cooled by the cooling plate via the outer connection coils which are connected to the one end portions and the other end portions of the radially outer and inner coil bars, so that the radially outer coil bars and the radially inner coil bars can be cooled uniformly, thereby suppressing the generation of heat distribution of the coils.

Claim 12 provides, based on Claim 1, the stator, wherein the base plates are made of a non-magnetic material, wherein the coil bars which are respectively disposed in the slots in the stator core are respectively covered by an insulation material (e.g., an insulation material 28 in embodiment), wherein the connection coils are disposed in plural grooves (e.g., outer surface grooves 37 and inner surface grooves 38 in embodiment) which are formed on the base plates so that the connection coils of the same phase are connected together while the connection coils of the different phases are insulated from each other, and wherein an insulation sheet (e.g., an insulation sheet 65 in embodiment) is provided between the stator core and each of the base plates.

Claim 13 provides, based on Claim 12, the stator, wherein the coil bars to be respectively inserted in the slots are each made integral by the insulation material.

Claim 14 provides, based on Claim 12, the stator, wherein the coil bars covered by the insulation material are press fitted in the slots, respectively.

Claim 15 provides, based on Claim 12, the stator, wherein the connection coils each includes an inner connection coil (e.g., an inner connection coil 42 in embodiment) and an outer connection coil (e.g., an outer connection coil 41 in embodiment) which are disposed in different axial positions, wherein the grooves (e.g., the outer surface grooves 37 and the inner surface grooves 38 in embodiment) are formed on an outer surface (e.g., an outer surface 35 in embodiment) and an inner surface (e.g., an inner surface 36 in embodiment) of each base plate which are opposite from each other, and wherein the outer connection coils are disposed in the grooves formed on the outer surface, while the inner connection coils are disposed in the grooves formed on the inner surface.

According to Claim 12, the coil bars are each covered by the insulation material, and the connection coils of the different phases are insulated from each other while those of the same phase are connected together. Additionally, the insulation sheet is provided between the stator core and each of the base plates. Therefore, the insulation between the coils of the different phases and between the coils and the stator core can be ensured.

According to Claim 13, the handling properties are improved so that the coil bars can easily be inserted in the slots.

According to Claim 14, the coil bars which are covered by the insulation material can be surely fixed in each of the slots in the stator core easily.

According to Claim 15, the insulation between the outer connection coils and the inner connection coils is ensured by the base plates.

DETAILED DESCRIPTION

Figure 1:
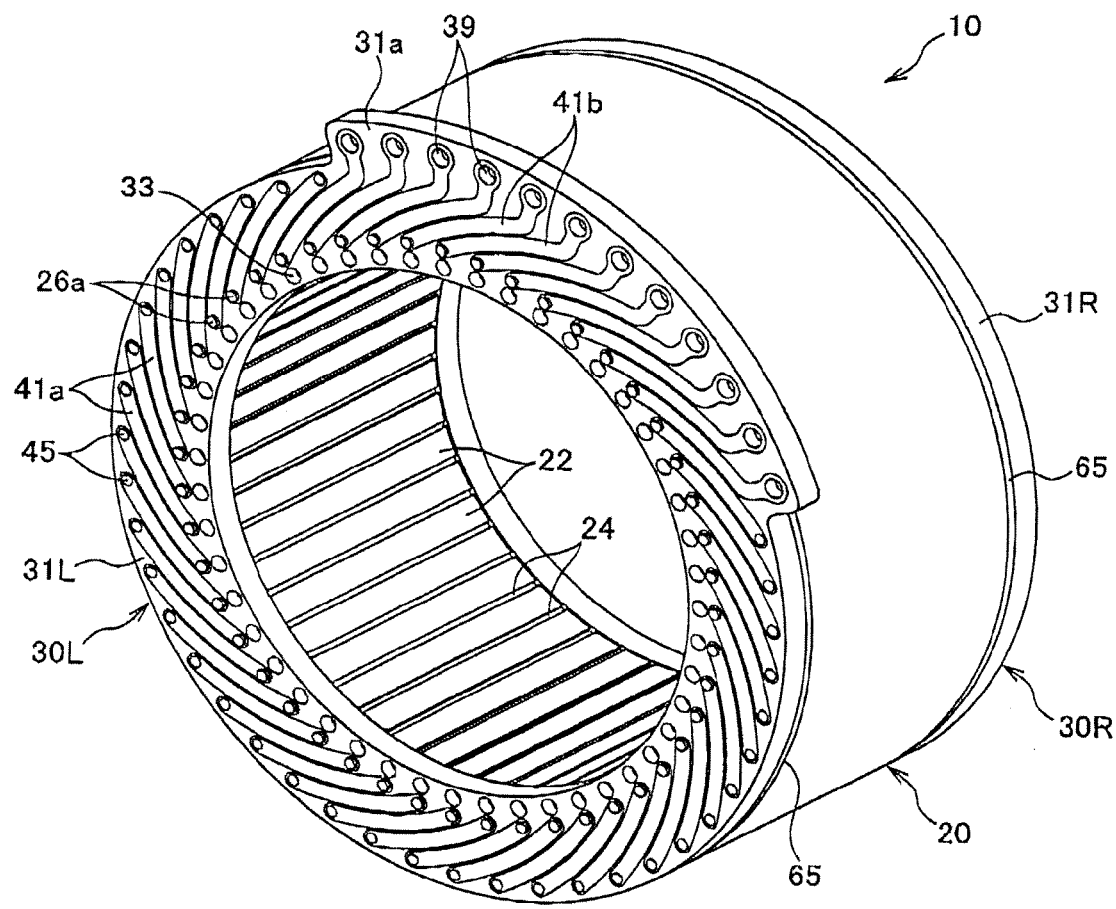
FIG. 1 perspectively shows a stator for an electric rotary machine according to the invention.

An embodiment will be described by reference to the accompanying drawings. The drawings are to be seen in an orientation where reference numerals look properly.

Figure 2:
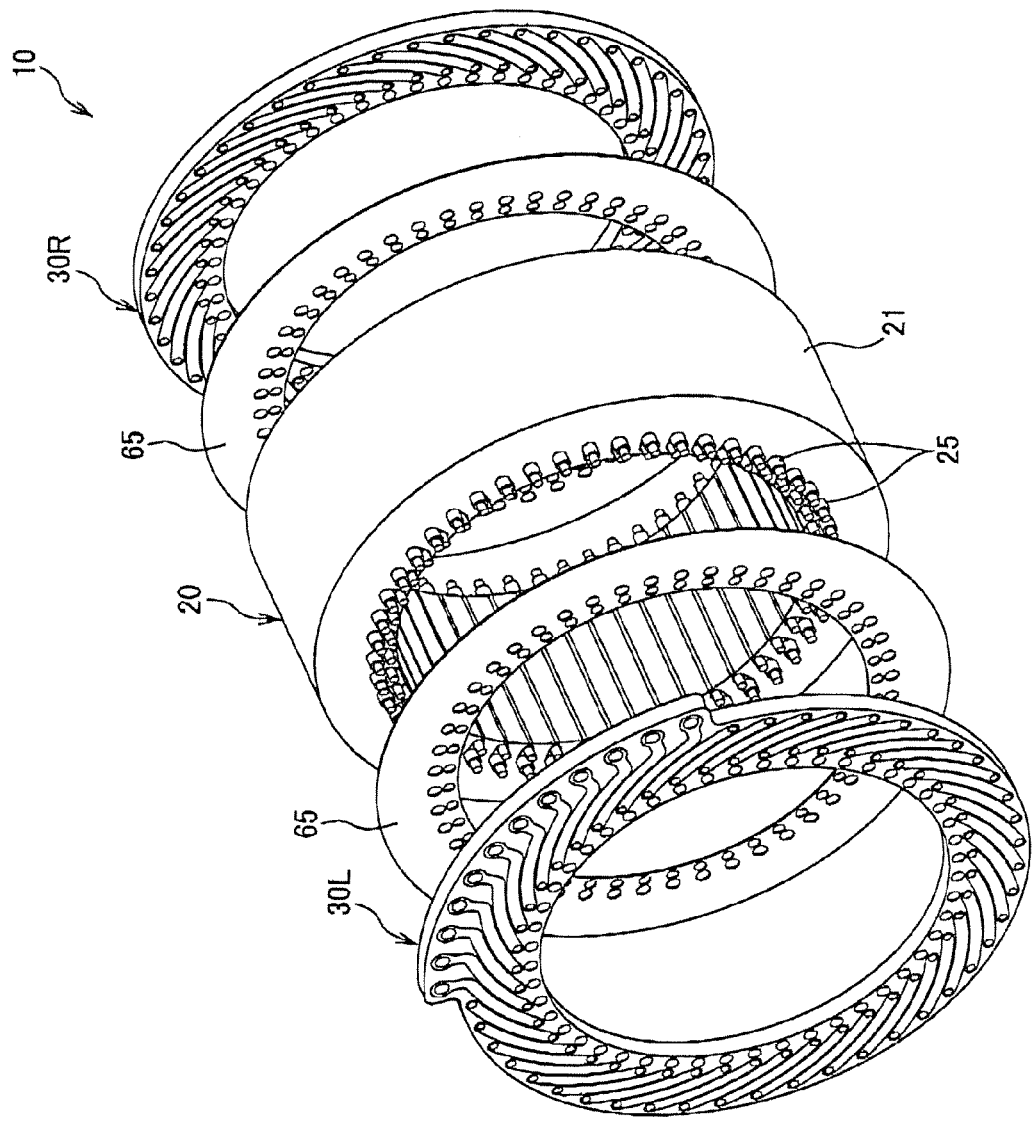
FIG. 2 perspectively shows an exploded state of the stator shown in FIG. 1.
Figure 3A:
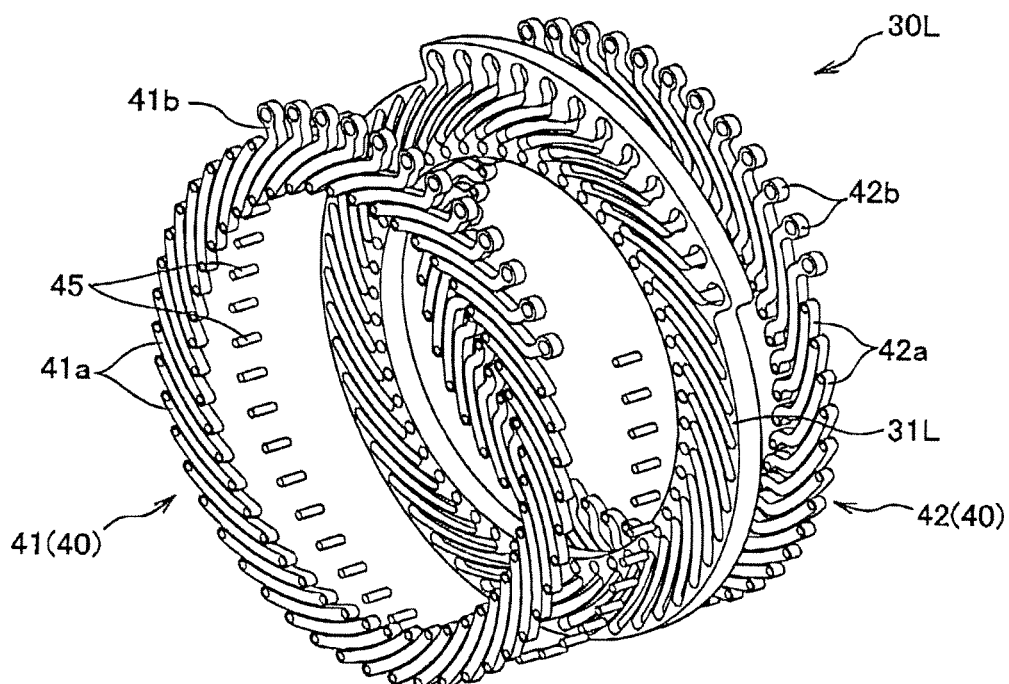
FIGS. 3A and 3B perspectively show exploded states of base plate assemblies shown in FIG. 2, respectively.
Figure 3B:
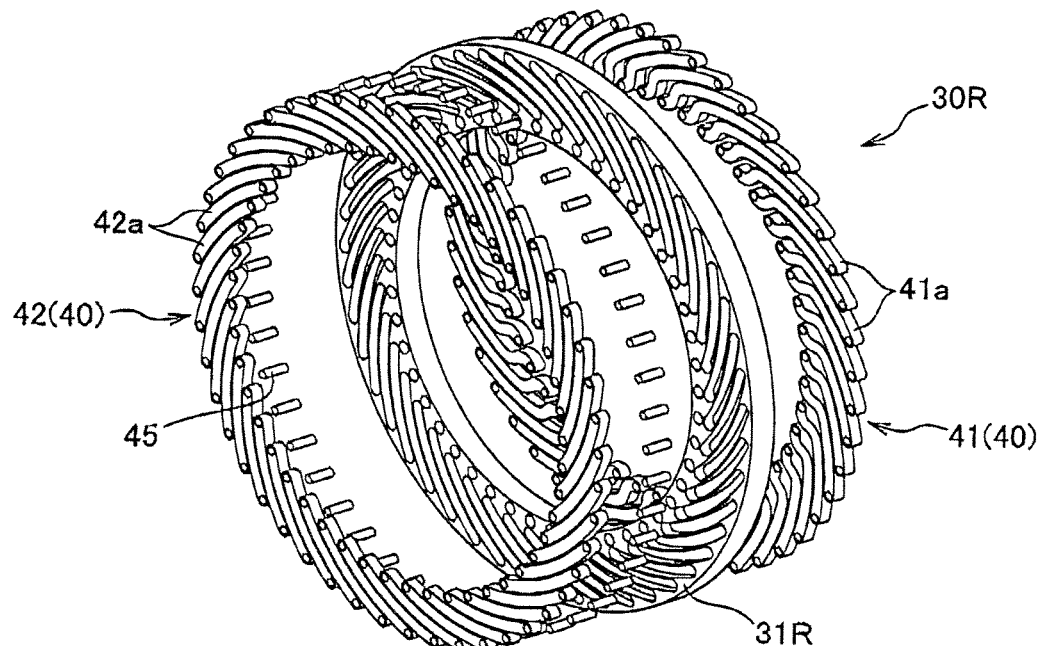
Figure 5:
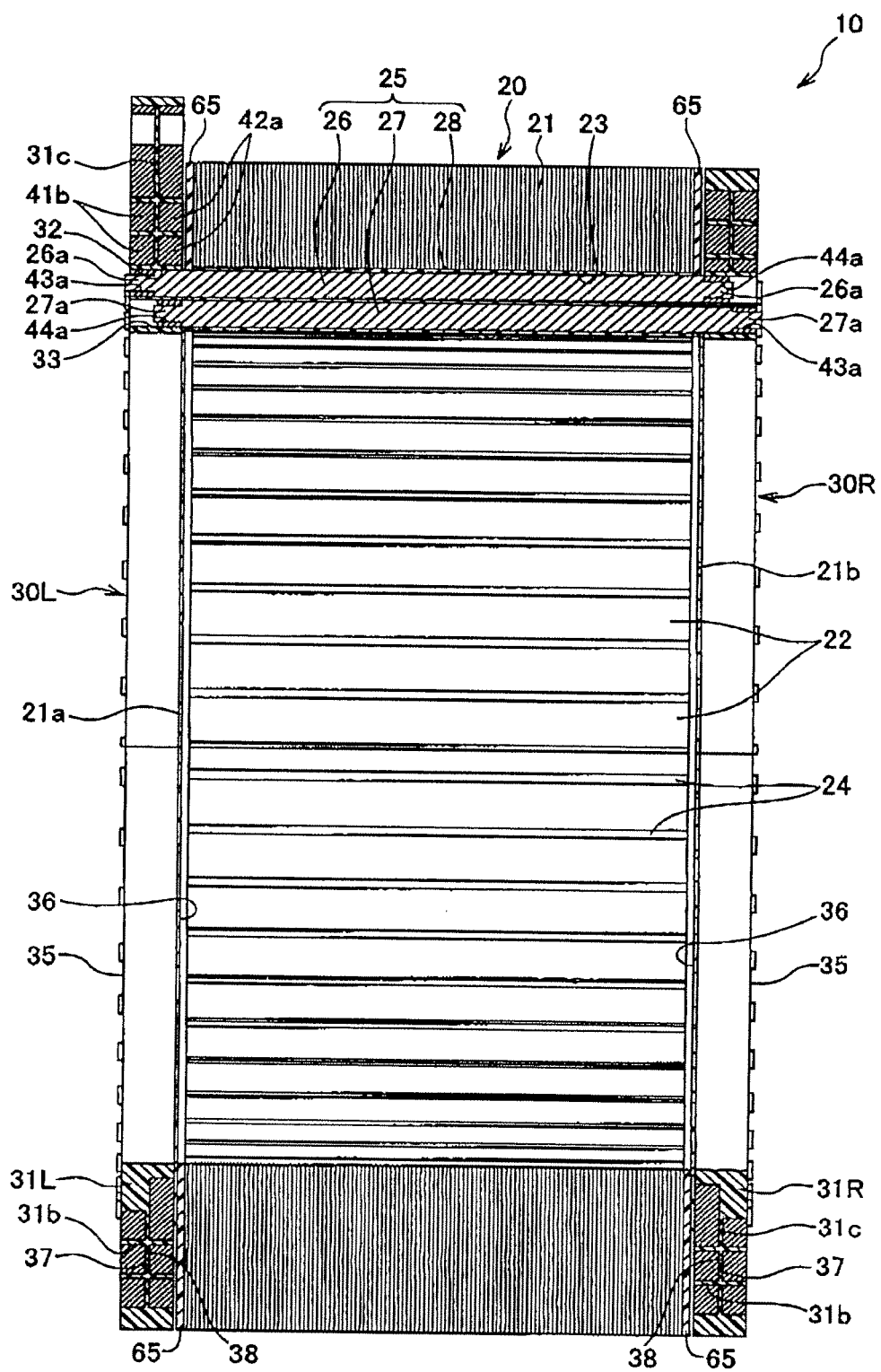
FIG. 5 cross-sectionally shows the stator along the line A-A in FIG. 6.

As shown in FIGS. 1, 2 and 5, a stator 10 for an electric rotary machine according to the embodiment includes a stator core assembly 20 and a pair of base plate assemblies 30L, 30R. The base plate assemblies 30L, 30R are respectively disposed on ends of the stator core assembly 20. An insulation sheet 65 which is made of, for example, silicone is disposed between the stator core assembly 20 and each of the base plate assemblies 30L, 30R.

The stator core assembly 20 includes a stator core 21 and plural (48, in the embodiment) coil bars 25.

The stator core 21 is made by laminating plural silicon steel sheets which are blanked out by a blanking press. The stator core 21 includes 48 teeth 22 provided on a radially inner side thereof and 48 slots 23 which are formed between the adjacent teeth 22, 22. The slots 23 are formed so as to penetrate the stator core 21 in an axial direction thereof and have a substantially elliptic shape which is elongated in a radial direction of the stator core 21 as viewed from the axial direction thereof. Opening portions 24 are opened to an inner circumferential surface of the stator core 21.

Figure 4:
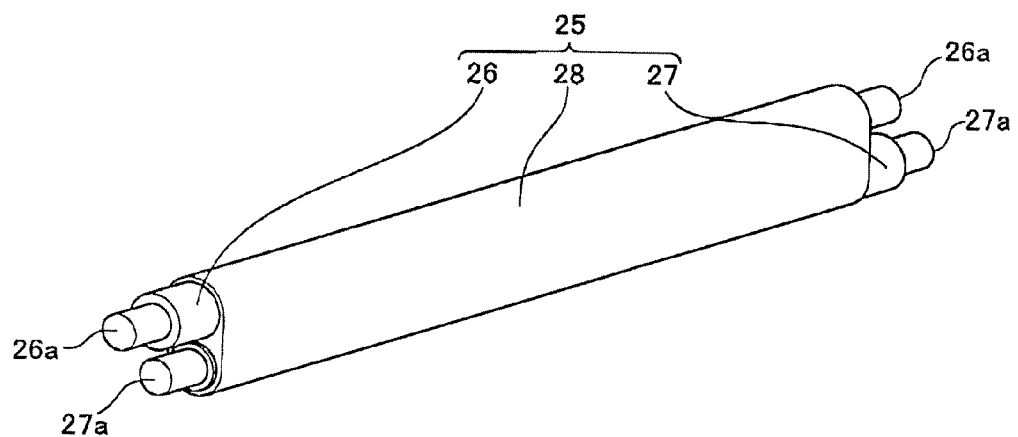
FIG. 4 perspectively shows a coil bar.

Also referring to FIG. 4, the coil bar 25 includes a radially outer coil bar 26 and a radially inner coil bar 27 which have the same shape and length. The radially outer coil bar 26 and the radially inner coil bar 27 are disposed parallel while being offset from each other in the axial direction by such an extent as a thickness of a connection coil 40. The radially outer coil bar 26 and the radially inner coil bar 27 are formed integrally by being covered by an insulation material 28 which is injection molded from a resin, with both ends of each coil bar left uncovered. Specifically, each of the radially outer coil bar 26 and the radially inner coil bar 27 has a length which is substantially equal to a sum of an axial length of the stator core 21 and a thickness of three connection coils 40. Small-diameter portions 26a, 27a are formed at both the ends of the radially outer coil bar 26 and the radially inner coil bar 27, respectively, the length of the small-diameter portions 26a, 27b being substantially equal to the thickness of the connection coil 40.

As shown in FIG. 5, the plural (48, in the embodiment) coil bars 25 are respectively inserted in the 48 slots 23 in the stator core 21 so as to be aligned in a circumferential direction of the stator core 21. In this state, the radially outer coil bar 26 is situated radially outwards and the radially inner coil bar 27 is situated radially inwards. Thus, the plural coil bars 25 make up the stator core assembly 20.

When the coil bars 25 are respectively inserted in the slots 23, one small-diameter portion 26a of the radially outer coil bar 26 projects from one end face 21a (a left end face in FIG. 5) of the stator core 21 approximately by such an extent as a thickness of two connection coils 40, while the other small-diameter portion 26a projects from the other end face 21b (a right end face in FIG. 5) approximately by such an extent as the thickness of the connection coil 40.

On the other hand, one small-diameter portion 27a of the radially inner coil bar 27 projects from the one end face 21a of the stator core 21 approximately by such an extent as the thickness of the connection coil 40, while the other small-diameter portion 27a projects from the other end face 21b approximately by such an extent as the thickness of two connection coils 40. The insulation material 28 is interposed between the radially outer coil bar 26 and the radially inner coil bar 27 and the slot 23 so as to ensure the insulation between the radially outer and inner coil bars 26, 27 and the stator core 21. In the other words, the radially outer coil bar 26 and the radially inner coil bar 27 are covered by the insulation member 28 in such a state that the radially outer and inner coil bars 26, 27 are offset from each other in the axial direction so that the end portions thereof are situated at the different axial positions.

The insulation material 28 which covers the radially outer coil bar 26 and the radially inner coil bar 27 has substantially the same shape as that of the slot 23 and is sized slightly larger than the slot 23. Thus, the insulation material 28 can easily be press fitted in the slot 23 and fixed therein. In addition, since the radially outer coil bar 26 and the radially inner coil bar 27 are thicker than a conventional coil made by winding the windings, the space factor relative to the slot 23 can be improved.

As shown in FIGS. 1 to 7, the base plate assemblies 30L, 30R include base plates 31L, 31R and plural connection coils 40. The base plate assembly 30R is the same with the base plate assembly 30L except for the presence/absence of a connecting terminal portion and the shapes of grooves and the connection coils. The base plate assembly 30L will mainly be described hereinafter.

Figure 6:
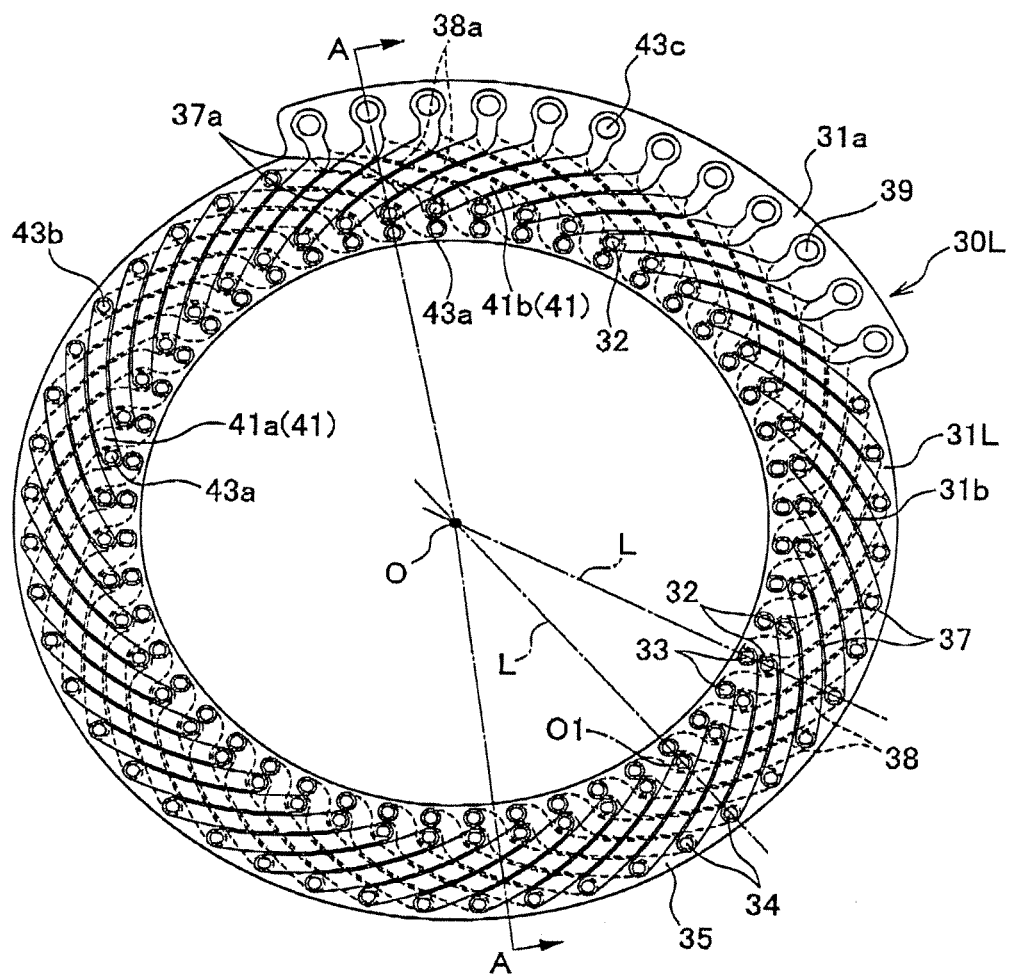
FIG. 6 shows the one base plate assembly shown in FIG. 3A from front.
Figure 7:
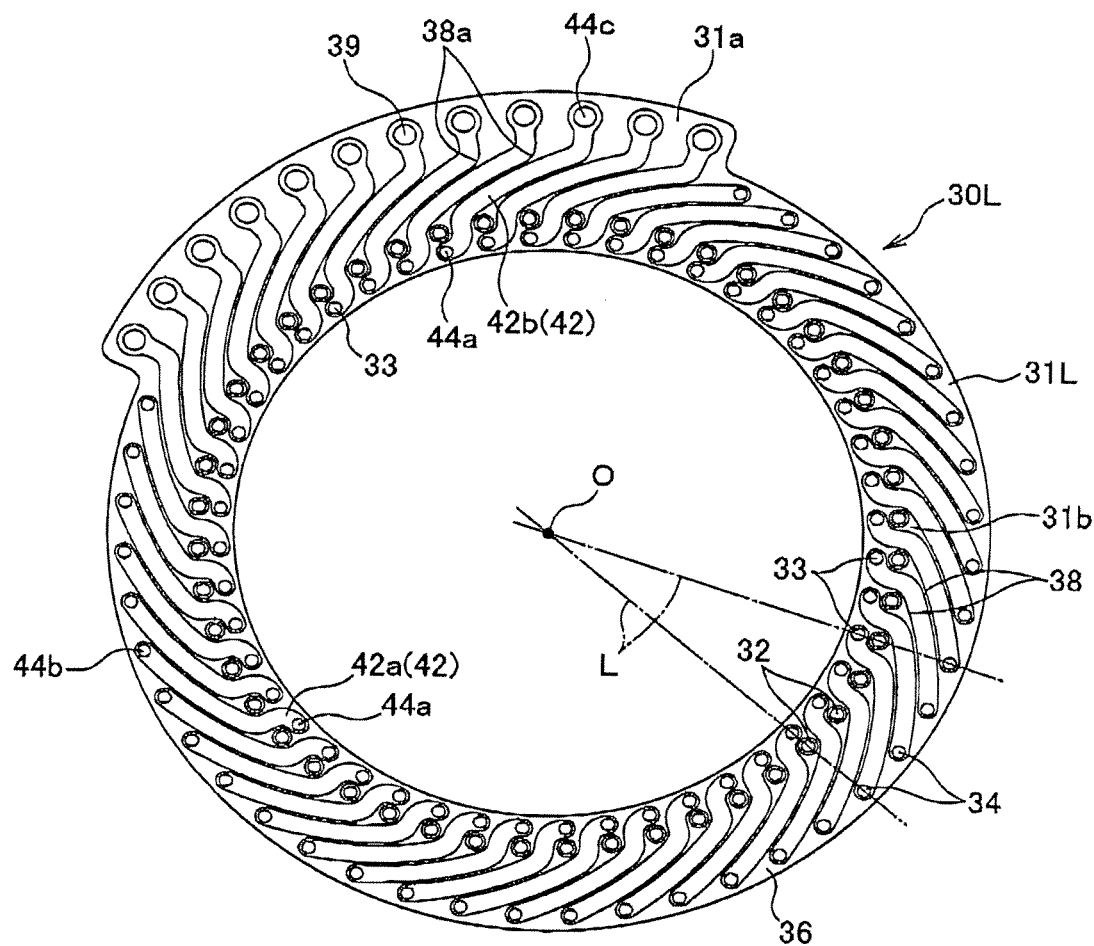
FIG. 7 shows the one base plate assembly shown in FIG. 3A from rear.

As shown in FIGS. 6 and 7, the base plate 31L is formed from an insulative resin (a non-magnetic material). The base plate 31L is a substantially annular member having substantially the same inside and outside diameters as those of the stator core 21. A deployment portion 31a is provided at an upper portion of the base plate 31L so as to extend radially outwards in a fan-like shape. The connecting terminal portion for connection to external equipment or the like is formed on the deployment portion 31a.

48 pairs of radially outer through holes 32 and radially inner through holes 33 are formed to penetrate the base plate 31L at a radially inner side thereof so as to correspond, respectively, to the radially outer coil bars 26 and the radially inner coil bars 27 of the coil bars 25 which are inserted in the slots 23 in the stator core 21.

The radially outer through hole 32 and the radially inner through hole 33 which make a pair are situated on the same straight line L which radially extends from a center O of the base plate 31L. On the same straight line L, a radially outermost hole 34 is further formed in the base plate 31L at a radially outer side thereof. The radially outer and inner through holes 32, 33 and radially outermost hole 34 establish a communication between an outer surface 35 and an inner surface 36 of the base plate 31L (refer to FIG. 5). On the other hand, 12 connecting terminal joining holes 39 are formed in the deployment portion 31a. The connecting terminal joining holes 39 are situated further radially outwards than the radially outermost holes 34.

As shown in FIGS. 5 to 7, plural (48) outer surface grooves 37 and inner surface grooves 38 are formed along involute curves so as to lie close to one another on the outer surface 35 and the inner surface 36 of the base plate 31L, respectively. The outer surface grooves 37 and the inner surface grooves 38 are formed to have a U-shaped section which is opened to the outer surface 35 and the inner surface 36, respectively. The adjacent outer surface grooves 37 and the adjacent inner surface grooves 38 are isolated by walls 31b which is erected from the base plate 31L, and the outer surface groves 37 and the inner surface grooves 38 which are opposite from each other in an axial direction are isolated by a bulkhead 31c, whereby the outer surface grooves 37 and the inner surface grooves 38 are electrically insulated one by one.

The base plate 31 has an axial width which is substantially equal to a sum of groove depths of the outer surface groove 37 and the inner surface groove 38 in which an outer connection coil 41 and an inner connection coil 42 are to be disposed and a thickness of the bulkhead 31c.

On the base plate 31L, as shown in a front view of the base plate assembly 30L in FIG. 6, many of the outer surface grooves 37 are each formed in a curved fashion along the involute curve so as to connect one radially outer through hole 32 with one radially outermost hole 34 which is situated on the same straight line L with another radially outer through hole 32 which lies three radially outer through holes ahead in a clockwise direction from the one radially outer through hole 32. On the other hand, 12 outer surface grooves 37 (outer surface grooves 37a) which extend towards the deployment portion 31a are formed to extend in an involute fashion from the corresponding radially outer through holes 32 to positions of three radially outer through holes ahead and thereafter to be bent radially outwards towards the corresponding connecting terminal joining holes 39.

On the base plate 31L, as shown in a rear view of the base plate assembly 30L in FIG. 7, many of the inner surface grooves 38 are each formed in such a curved fashion as to avoid the interference with the corresponding radially outer through hole 32 so as to connect one radially inner through hole 33 with one radially outermost hole 34 which is situated on the same straight line L with another radially inner through hole 33 which lies three radially inner through holes ahead in a clockwise direction (in a counterclockwise direction n FIG. 6) from the one radially inner through hole 33. On the other hand, 12 inner surface grooves 38 (inner surface grooves 38a)

which extend towards the deployment portion 31a are formed to extend similarly in a curved fashion from the corresponding radially inner through holes 33 to positions of three radially inner through holes ahead and thereafter to be bent radially outwards towards the corresponding connecting terminal joining holes 39.

Namely, as shown in FIG. 6, the radially outer through hole 32 and the radially inner through hole 33 which are spaced six radially outer or inner through holes apart from each other in the clockwise direction (or in the counterclockwise direction) are connected to each other via the radially outermost hole 34 to which the outer surface groove 37 and the inner surface groove 38 commonly connect. In addition, the pair of outer surface groove 37a and inner surface groove 38a which connect to the common connecting terminal joining hole 39 connect the radially outer through hole 32 with the radially inner through hole 33 which are spaced six radially outer or inner through holes apart from each other in the clockwise direction (or in the counterclockwise direction).

In the base plate assembly 30R, each outer surface groove 37 on the base plate 31R has the same shape of each inner surface groove 38 on the base plate 31L, and each inner surface groove 38 on the base plate 31R has the same shape as each outer surface groove 37 on the base plate 31L.

The connection coil 40 is formed of a conductive material such as copper and is formed into the shape of a plate. The connection coils 40 include outer connection coils 41 (41a, 41b) which are inserted in the outer surface grooves 37, 37a and inner connection coils 42 (42a, 42b) which are inserted in the inner surface grooves 38, 38a. When the stator core assembly 20 and the base plate assemblies 30 are assembled together, the outer connection coils 41 are disposed on an axially outer side of the stator 10, and the inner connection coils 42 are disposed on an axially inner side of the stator 10.

As shown in FIG. 6, the outer connection coils 41a are formed along the involute curves to have the same shape of the outer surface grooves 37, and connection holes 43a, 43b are formed at both end portions of the outer connection coils 41a. The connection hole 43a has a diameter substantially the same as that of the small-diameter portion 26a of the radially outer coil bar 26, and the connection hole 43b has a diameter substantially the same as that of a connecting pin 45 for connecting together the outer connection coil 41a and the inner connection coil 42a. The outer connection coils 41b are formed in a curved fashion to have the same shape as that of the outer surface grooves 37a, and connection holes 43a and connecting terminal holes 43c are formed at both end portions of the outer connection coils 41b.

As shown in FIG. 7, the inner connection coils 42a are formed along the involute curves to have the same shape of the inner surface grooves 38, and connection holes 44a, 44b are formed at both end portions of the inner connection coils 41b. The connection hole 44a has a diameter substantially the same as that of the small-diameter portion 27a of the radially inner coil bar 27, and the connection hole 44b has a diameter substantially the same as that of the connecting pin 45. The outer connection coils 42b are formed in a curved fashion to have the same shape as that of the inner surface grooves 38a, and connection holes 44a and connecting terminal holes 44c are formed at both end portions of the inner connection coils 42b.

That is, except for the portion of the base plate 31L where the connecting terminal joining holes 39 are formed, the inner connection coils 42a and the outer connection coils 41a, 41b that are all connected to the radially outer coil bars 26 are formed along the involute curves, and the inner connection coils 42a, 42b and the outer connection coils 41a that are all connected to the radially inner coil bars 27 are formed to extend radially outwards from the radially inner through holes 33 until bypassing the radially outer through hole 32 and then to extend along the involute curves.

The outer connection coils 41a, 41b are inserted in the outer surface grooves 37, 37a, respectively, and the inner connection coils 42a, 42b are inserted in the inner surface grooves 38, 38a, respectively. The conductive connecting pins 45 which are made of copper or aluminum are inserted in the radially outermost holes 34 so as to electrically connect the outer connection coils 41a and the inner connection coils 42a.

When the base plate assemblies 30L, 30R are built up, the connection holes 43a and the connection holes 44a which are disposed six connection holes apart from each other in the clockwise direction (or in the counterclockwise direction) are electrically connected via the outer connection coils 41a, the connecting pins 45 and the inner connection coils 42a.

In the embodiment, the independent connecting pins 45 are provided for electrically connecting the outer connection coils 41a and the inner connection coils 42a. However, projecting portions having the same shape of the connecting pin 45 may be formed integrally on either of the outer connection coils 41a and the inner connection coils 42a, so that the projecting portions are inserted in connection holes 43b, 44b provided on the other of the outer connection coils 41a and the inner connection coils 42a.

The pair of above-configured base plate assemblies 30L, 30R, are disposed in the predetermined positions on both the ends of the stator core assembly 20 so as to be assembled thereto. As shown in FIG. 5, in the base plate assembly 30L at the one end face 21a (the left end face in the figure) of the stator core 21, the small-diameter portions 26a of the radially outer coil bars 26 are inserted in the connection holes 43a of the outer connection coils 41a, 41b, and the small-diameter portions 27a of the radially inner coil bars 27 are inserted in the connection holes 44a of the inner connection coils 42a, 42b. Thereafter, the small-diameter portions 26a, 27a are crimped to be fixed in the corresponding connection holes 43a, 44a. The outer connection coils 41a, 41b and the inner connection coils 42a, 42b function as spanning portions of a coil 50 as they connect the coil bars 25 of the same phase (for example, a U-phase) together.

In the base plate assembly 30R at the other end face 21b (the right end face in the figure) of the stator core 21, the small-diameter portions 26a of the radially outer coil bars 26 are inserted in the connection holes 44a of the inner connection coils 42a, and the small-diameter portions 27a of the radially inner coil bars 27 are inserted in the connection holes 43a of the outer connection coils 41a. Thereafter, the small-diameter portions 26a, 27a are crimped to be fixed in the corresponding connection holes 43a, 44a. The outer connection coils 41a and the inner connection coils 42a also unction as spanning portions of the coil 50 as they connect the coil bars 25 of the same phase (for example, the U-phase) together.

With respect to the radially outer coil bar 26 and the radially inner coil bar 27 which are disposed in the same slot 23, the outer connection coil 41a connected to the one end (the left end in FIG. 5) of the radially outer coil bar 26 extends radially outwards and in the clockwise direction in FIG. 6 to connect to the inner connection coil 42a of the same phase, while the inner connection coil 42a connected to the other end (the right end in FIG. 5) of the radially outer coil bar 26 extends radially outwards and in the counterclockwise direction in FIG. 6 to connect to the outer connection coil 41a of the same phase. And the inner connection coil 42a connected to the one end (the left end in FIG. 5) of the radially inner coil bar 27 extends radially outwards and in the counterclockwise direction in FIG. 6 to connect to the outer connection coil 41*a* of the same phase, while the outer connection coil 41*a* connected to the other end (the right end in FIG. 5) extends radially outwards and in the clockwise direction in FIG. 6 to connect to the inner connection coil 42*a* of the same phase.

Figure 8:
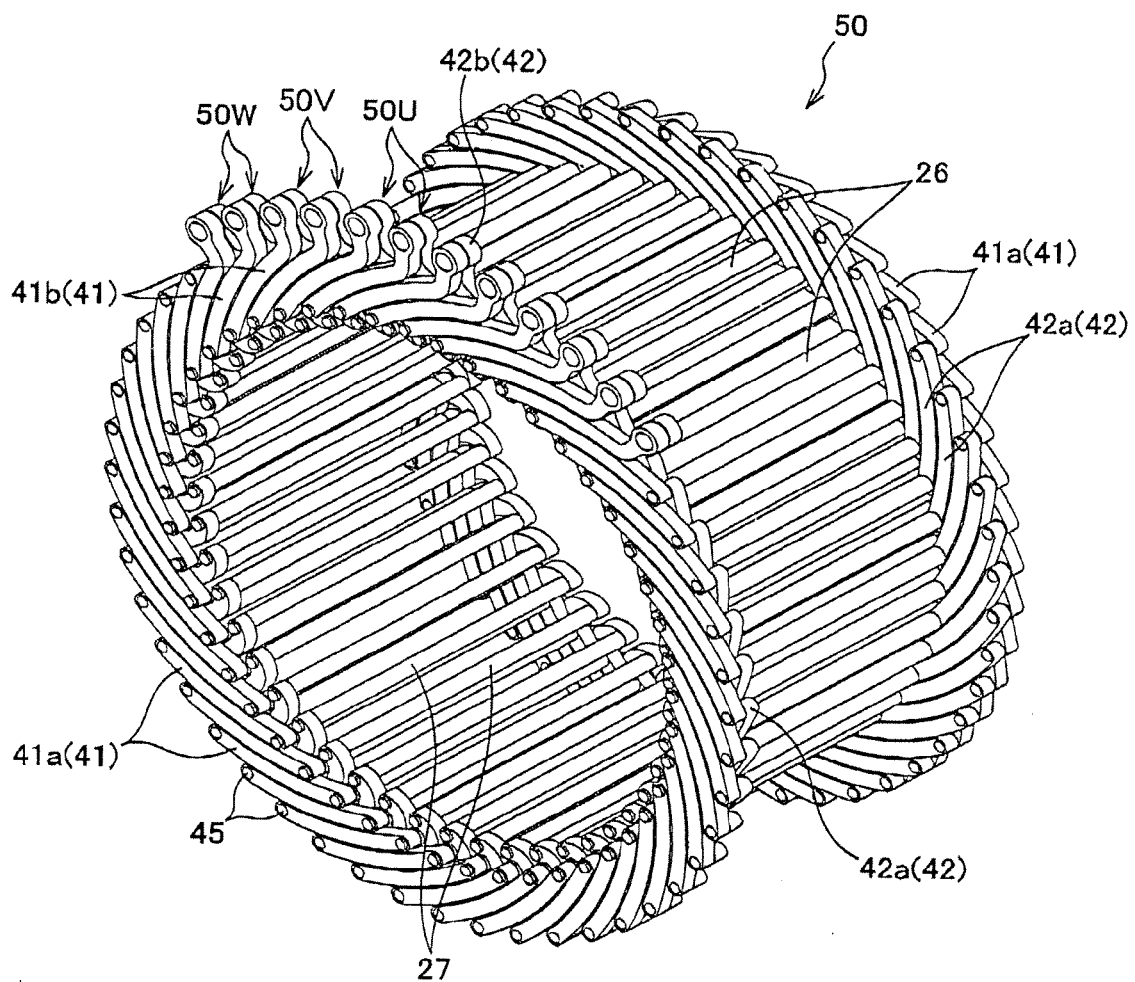
FIG. 8 perspectively shows double-slot type, segmented coils of plural phases.
Figure 9:
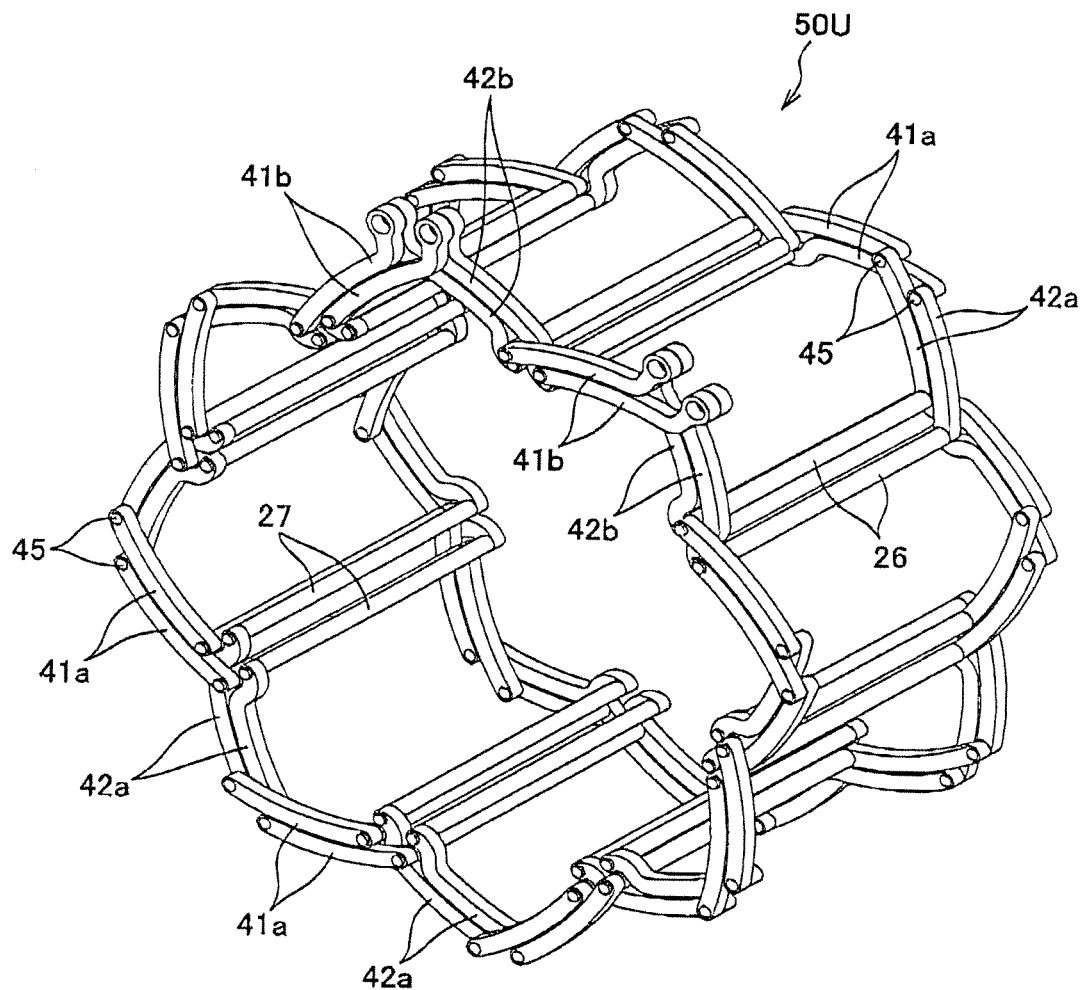
FIG. 9 perspectively shows coils of one phase which are taken out from FIG. 8.
Figure 10:
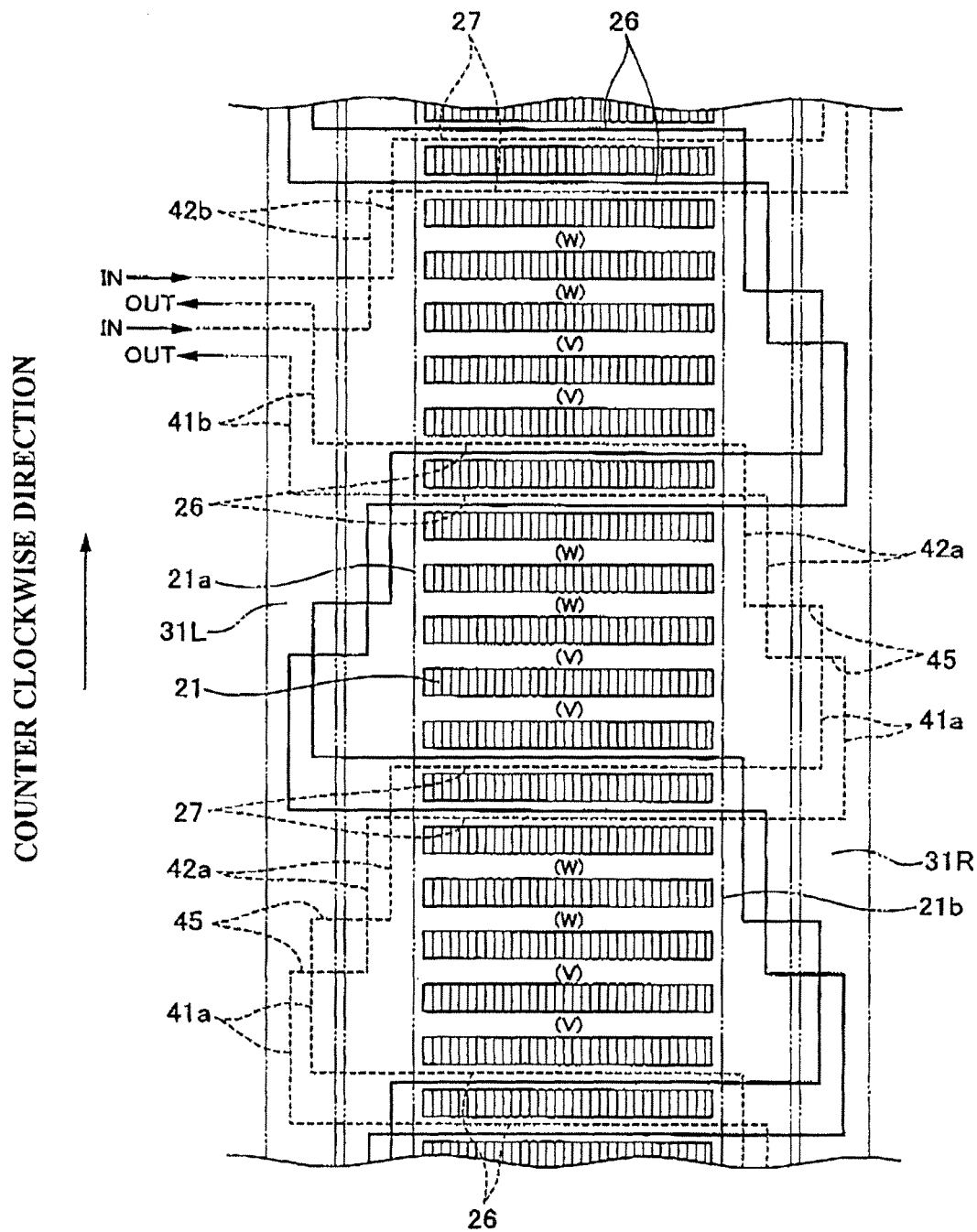
FIG. 10 exemplarily shows the configuration of the coils of the plural phases.

The stator 10 is made up by assembling the pair of base plate assemblies 30L, 30R to both the ends of the stator core assembly 20, whereby segmented coils 50 make up four coil loops for each phase which has the same construction (U-phase coils 50U, V-phase coils 50V, and W-phase coils 50W). Here, among the four coil loops of each phase (U-phase coils 50U, V-phase coils 50V, and W-phase coils 50W), two coil loops which share the same slots 23 are referred to as a "set". Two sets of U-phase coils 50U, two sets of V-phase coils 50V, and two sets of W-phase coils 50W are arranged in the counterclockwise direction in this order (refer to FIGS. 8 and 10). FIG. 8 perspectively shows double-slot type, segmented coils of plural phases (U-, V- and W-phase), and FIG. 9 perspectively shows coils of one phase (for example, U-phase). FIG. 10 exemplarily shows the configuration of the coils of the plural phases, and FIG. 11A enlargedly shows a part of FIG. 6, and FIG. 11B cross-sectionally shows the part along the line B-B in FIG. 11A.

In the stator 10, the outer connection coils 41*a*, 41*b* and the inner connection coils 42*a*, 42*b* are disposed within a region where the stator core 21 is projected in the axial direction, while being shifted in the axial direction.

Figure 11A:
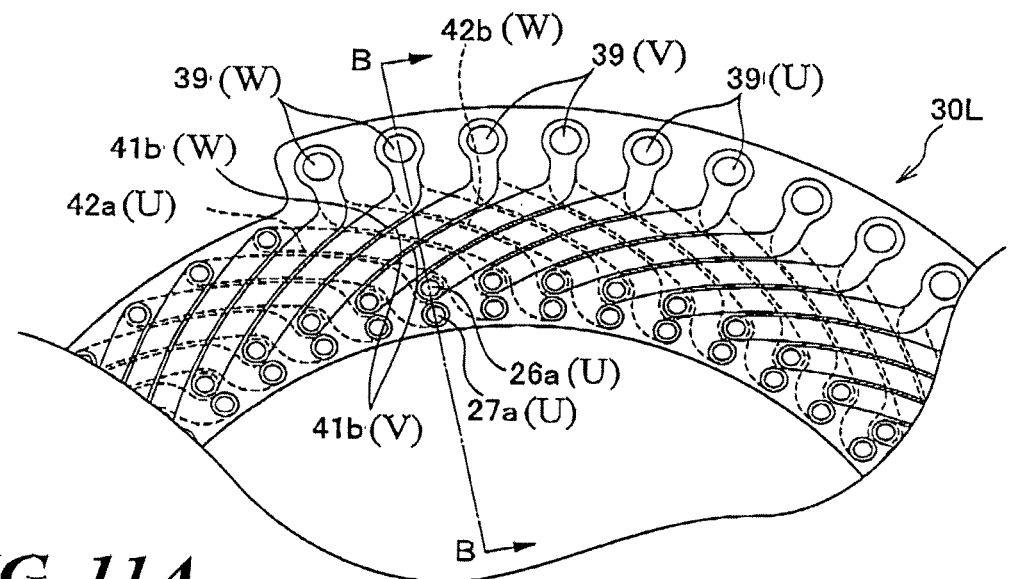
FIG. 11A enlargedly shows a part of FIG. 6, and FIG. 11B cross-sectionally shows the part along the line B-B in FIG. 11A.
Figure 11B:
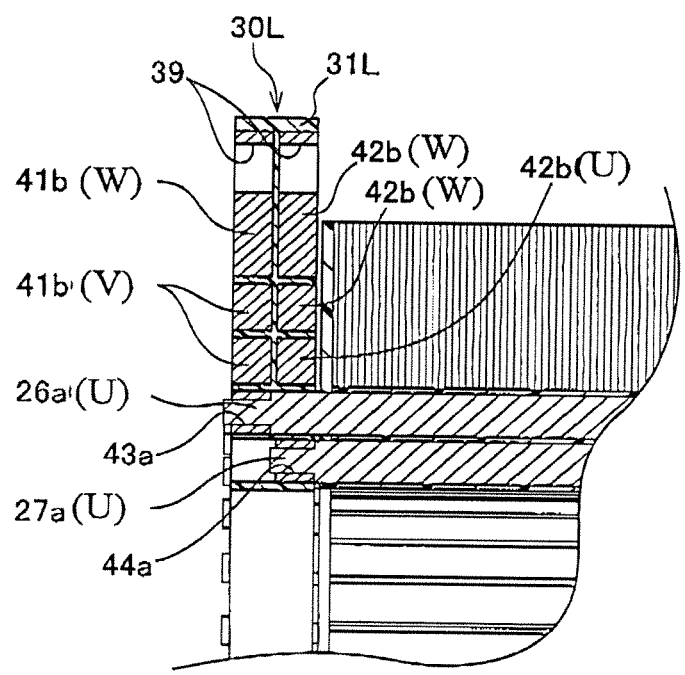

As shown in FIG. 11B, on the outer surface of the base plate 31L, two V-phase outer connection coils 41*b* and one W-phase outer connection coil 41*b* are radially aligned in this order from a radially inner side (from the small-diameter portion 26*a* of the U-phase radially outer coil bar 26). And, on the inner surface of the base plate 31L, one U-phase connection coil 42*b* and two W-phase inner connection coils 42*b* are radially aligned in this order from the radially inner side. Thus, as shown in FIG. 11A, the inner connection coils 42*a*, 42*b* face the outer connection coils 41*a*, 41*b* of the different phase in the axial direction, and the outer connection coils 41*a*, 41*b* face the inner connection coils 41*a*, 42*b* of the different phase in the axial direction.

Outer surfaces of the plural outer connection coils 41*a*, 41*b* which are disposed at the axially outer ends of the stator 10 are flush with the end faces of the base plates 31L, 31R.

As shown in FIG. 5, when the coils 50 are assembled to the stator 10, the outer connection coils 41*a*, 41*b* which connect to the radially outer coil bars 26 are situated axially outwards at the one end face 21*a* of the stator core 21, and the outer connection coils 41*a* which connect to the radially inner coil bars 27 are situated axially outwards at the other end face 21*b* of the stator core 21.

Figure 12A:
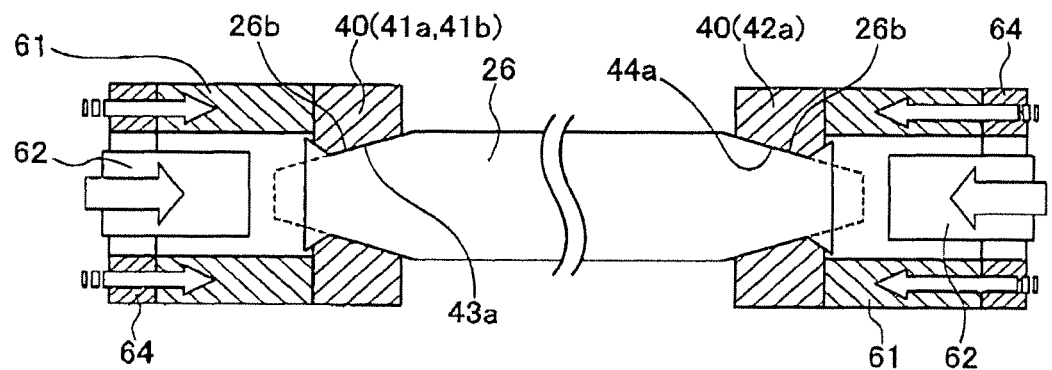
FIG. 12A exemplarily shows a state in which a coil bar and connection coils are connected together through crimping, FIG. 12B exemplarily shows a state in which a coil bar having semi-spherical end portions is connected to connection coils through press fitting, and FIG. 12C exemplarily shows a state in which a coil bar having semi-circular end portions and a rectangular cross section is connected to connection coils by being press fitted in holes in the connection coils.

FIG. 12 exemplarily shows connecting constructions between a coil bar and connection coils. Although the radially outer coil bar 26 is mainly exemplified, the below-described connecting constructions can also be applied to the radially inner coil bar 27. In a radially outer coil bar 26 shown at FIG. 12A, tapered portions 26*b* which are tapered towards ends of the radially outer coil bar 26 are formed at both end portions, and a connection hole 43*a* in an outer connection coil 41*a* or 41*b* and a connection hole 44*a* in an inner connection coil 42*a* are made into a tapered hole having a gradient which is substantially equal to that of the end portions of the radially outer coil bar 26. When the base plates 31L, 31R are assembled to the stator core 21, the connection coils 40 are then pressed axially relative to the radially outer coil bar 26 by pressing members 61 of jigs by with elastic forces of springs 64, whereby the connection holes 43*a*, 44*a* of the connection coils 40 are fitted on the tapered portions 26*b* of the radially outer coil bar 26. Then, the end portions of the radially outer coil bar 26 are crimped by being crushed to be deformed at ends by a punch 62, whereby the coil bar 26 and the connection coils 40 are fixed together.

Since the fitting portions between the radially outer coil bar 26 and the connection coils 40 are initially tapered, even when centers of the radially outer coil bar 26 and the connection coils 40 are offset slightly, the radially outer coil bar 26 and the connection coils 40 can be centered by the pressures applied from the pressing members 61 and therefore can be surely joined together to thereby establish an electric communication therebetween. Such joining can be executed at plural locations (96 locations, in the embodiment) through a single pressing operation. Thus, the joining work can be executed efficiently, thereby increasing the fabrication efficiency. The coil bar 25 and the connection coils 40 do not necessarily have to be connected together by press fitting and crimping, and they may be connected together by press fitting or crimping. Thus, a connection of the coil bar 25 and the connection coils 40 based on press fitting will be described below.

Figure 12B:
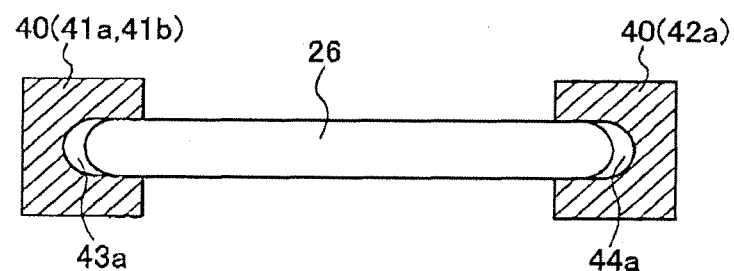

End portions of a radially outer coil bar 26 shown in FIG. 12B are formed into a semi-spherical shape, and connection holes 43*a*, 44*a* of connection coils 40 are formed into a semi-spherical depressed portion. In this construction, the semi-spherical end portions of the radially outer coil bar 26 are press fitted in the connection holes 43*a*, 44*a* of the connection coils 40, whereby the radially outer coil bar 26 and the connection coils 40 are joined together. Also in this construction, the radially outer coil 26 and the connection coils 40 can be centered. And, such joining can be executed at plural locations through a single pressing operation, whereby the radially outer coil 26 and the connection coils 40 can be joined together efficiently.

Figure 12C:
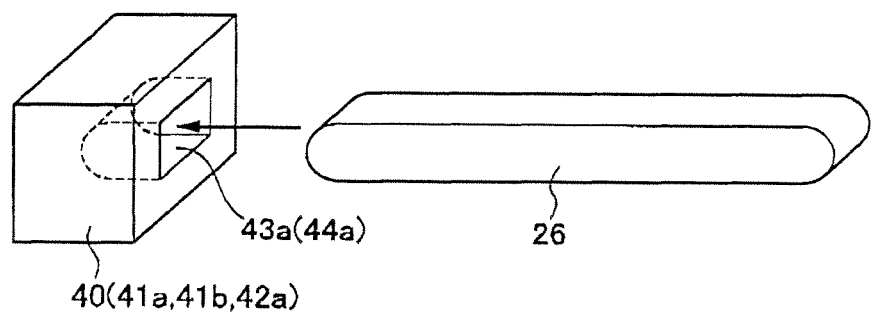

A radially outer coil bar 26 shown in FIG. 12C is formed to have a rectangular cross section, and end portions thereof are formed into a semicircular shape. Similarly, connection holes 43*a*, 44*a* of connection coils 40 are formed into a semicircular depressed portion, and the radially outer coil bar 26 and the connection coils 40 are joined together by press fitting the end portions of the radially outer coil 26 into the connection holes 43*a*, 44*a*. When the rectangular cross section is adopted, since the radially outer coil bar 26 has an angular shape which closely matches that of the slot 23, the space factor of the slot 23 can be enhanced.

Figure 13:
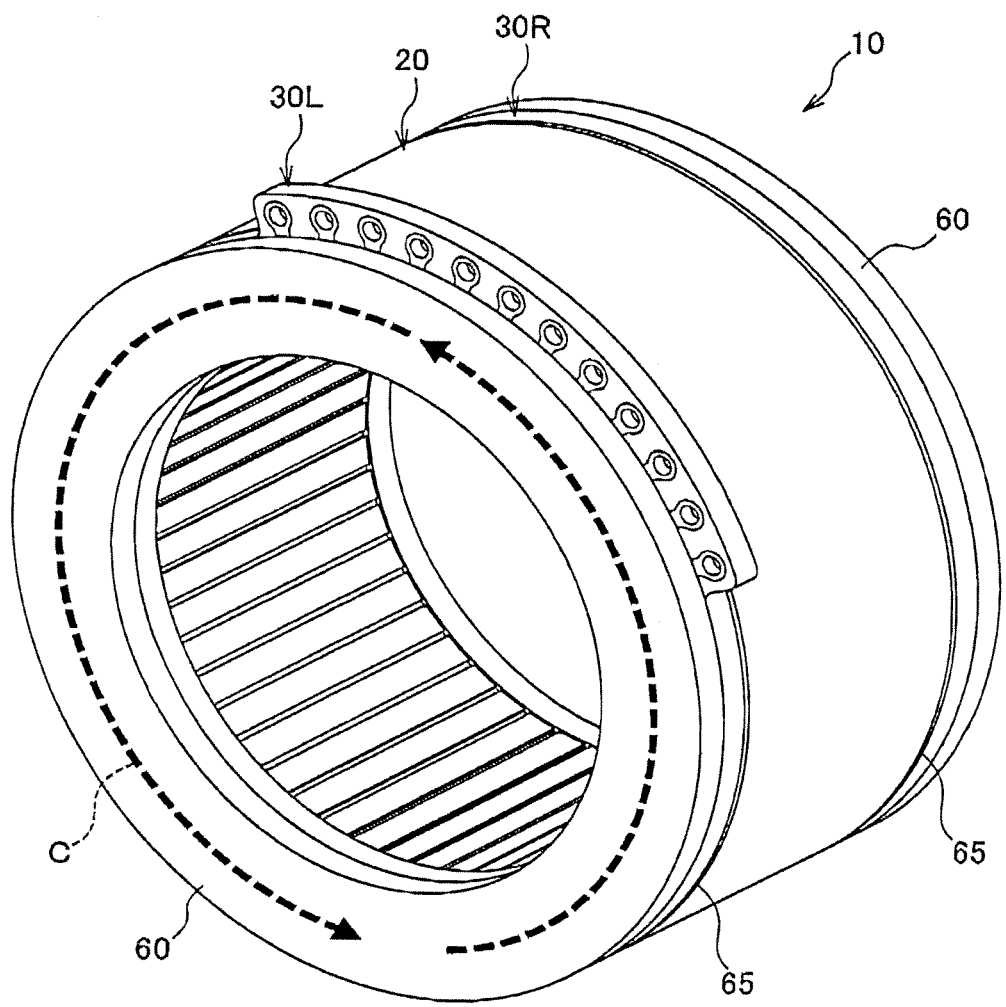
FIG. 13 perspectively shows the stator in which cooling plates are disposed on end faces of the base plate assemblies.
Figure 14:
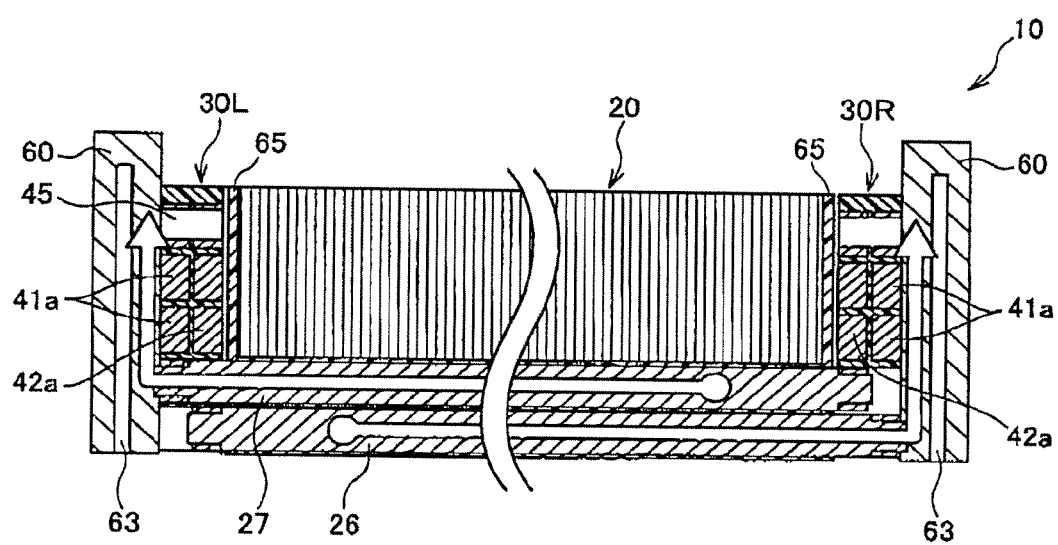
FIG. 14 cross-sectionally illustrates a part of the stator including the cooling plates shown in FIG. 13.

FIG. 13 perspectively shows the stator in which cooling plates are disposed at end faces of the base plate assemblies, and FIG. 14 cross-sectionally illustrates a part thereof. As shown in FIGS. 13 and 14, a pair of cooling plates 60 are disposed so as to be in contact with the base plate assemblies 30 which are provided at both the end faces of the stator 10. A refrigerant passageway 63 is formed in an interior of the cooling plate 60 so that a refrigerant is allowed to circulate therein. For example, a refrigerant is sent under pressure from a refrigerant supply system, not shown, and is circulated in a direction indicated by an arrow C (refer to FIG. 13) in the refrigerant passageway 63. Thus, the stator 10 can be cooled positively via the outer connection coils 41*a*, 41*b* (the spanning portions) of the stator 10 with which the pair of cooling plates 60 are in contact.

Since front surfaces of the outer connection coils 41*a*, 41*b* are flat, the outer connection coils 41*a*, 41*b* are brought into surface contact with, the cooling plates 60. Therefore, compared with a conventional coil made by winding the windings, the contact area with the cooling plates 60, that is, the heat conduction area is large, thereby cooling the stator 10 efficiently.

In the coils 50, the outer connection coils 41a, 41b which connect to the radially outer coil bars 26 are situated axially outwards at the one end face 21a of the stator core 21 while the outer connection coils 41a which connect to the radially inner coil bars 27 are situated axially outwards at the other end face 21b of the stator core 21. Therefore, the radially outer coil bars 26 and the radially inner coil bars 27 are cooled uniformly via the outer connection coils 41a, 41b, thereby suppressing the heat distribution of the coils 50. Since the coils 50 are free from concerns caused when an oil cooling using an ATF oil or the like is selected that the coils and the insulation materials are badly affected by the ATF oil which is sprayed to the coils, the reliability and durability of the stator are enhanced.

According to the stator 10 of the embodiment, the stator 10 includes the stator core assembly 20 which is made up of the stator core 21 and the plural coil bars 25 and the pair of base plate assemblies 30L, 30R which are made up of the base plates 31L, 31R and the plural connection coils 40 and which are disposed at both the ends of the stator core assembly 20. Therefore, there is no need to wind windings around the stator core as done conventionally, and hence, the stator 10 can be fabricated without using expensive exclusive devices such as a winding machine and an inserter, thereby suppressing equipment costs. Compared with the conventional coil fabrication process using the U-shaped segments in which the U-shape forming step, the leg bending step and the end portion joining step are executed at each location, the plural coil bars 25 and connection coils 40 can be joined together simultaneously at one time, thereby fabricating the stator 10 easily.

Since the plural coil bars 25 and the plural connection coils 40 are connected together by press fitting or crimping or by press fitting and crimping, the plural coil bars 25 and connection coils 40 can be connected together through a single assembling step, thereby enhancing the fabrication efficiency.

Since the plural connection coils 40 are disposed within the region where the stator core 21 is projected in the axial direction, the size of the stator 10 is the radial direction can be reduced.

The stator 10 is fabricated through the step of forming the stator core assembly 20 by inserting the coil bars 25 in the slots 23 in the stator core 21, the step of forming the base plate assemblies 30L, 30R by disposing the connection coils 40 on the base plates 31L, 31R, and the assembling step of assembling the base plate assemblies 30L, 30R to the axial ends of the stator core assembly 20. Therefore, the conventional fabrication process of the stator 10 can be simplified, thereby fabricating the stator 10 easily and efficiently.

In the assembling step, the plural coil bars 25 of the stator core assembly 20 and the plural connection coils 40 of the base plate assemblies 30L, 30R are connected together by press fitting together or crimping the end portions thereof or by press fitting together and crimping the end portions thereof. Therefore, the plural coil bars and connection coils can be connected together through a single assembling step, thereby enhancing the fabrication efficiency.

According to the stator 10 of the embodiment, the plural connection coils 40 are provided on the pair of base plates 31 which are provided at both the ends of the stator core 21, and the connection coils 40 which connect together the substantially-straight coil bars 25 of the same phase respectively inserted in the plural slots 23 in the stator core 21 make up the spanning portions. The cooling plates 60 are brought into direct surface contact with the spanning portions (the outer connection coils 41) which are flush with the axial end faces 35 of the base plates 31 to be exposed to the same axial end faces. Therefore, the contact area between the spanning portions and the cooling plate 60 can be increased to thereby efficiently cool the stator 10 and to enhance efficiency of the electric rotary machine.

The spanning portions (the outer connection coils 41) which are exposed to the axial end face do not necessarily have to be brought into direct surface contact with the cooling plate 60 and hence may be brought into indirect surface contact therewith. An insulation cover may be disposed on the axially outer sides of the pair of base plate assemblies 30L, 30R, or the axially outer sides may be coated with a resin or the like. The "indirect surface contact" means that the cooling plate 60 is brought into contact with the cover or the coated resin which is brought into contact with the spanning portions (the outer connection coils 41). Also in this case, the contact area between the spanning portions and the cooling plate 60 can be increased to thereby efficiently cool the stator 10 and to enhance efficiency of the electric rotary machine.

By water cooling the stator 10 with the cooling plates 60, it is possible to avoid the oil cooling in which the reduction in insulation properties may be caused by water contained in the insulation oil, in which copper may be attacked by the insulation oil, and in which the torque of the rotor may be lost by virtue of viscosity resistance produced by the insulation oil.

The outer connection coils 41 are disposed in the outer surface grooves 37 which are formed on the outer surface 35 of the base plate 31, while the inner connection coils 42 are disposed in the inner surface grooves 38 which are formed on the inner surface 36 thereof. The radially outer coil bars 26 are connected to the outer connection coils 41 at the one ends thereof and are connected to the inner connection coils 42 at the other ends, while the radially inner coil bars 27 are connected to the inner connection coils 42 at one ends thereof and are connected to the outer connection coils 41 at the other ends. Therefore, the radially outer coil bars 26 and the radially inner coil bars 27 are cooled by the cooling plates 60 via the outer connection coils 41 which are connected to the one ends and the other ends of the radially outer coil bars 26 and the radially inner coil bars 27, respectively, whereby the radially outer coil bars 26 and the radially inner coil bars 27 can be cooled uniformly, thereby suppressing the generation of heat distribution of the coils 50.

In the stator core 10 of the embodiment, the coil bars 25 are each covered by the insulation material 28, and the connection coils 40 of the different phases are insulated from each other while those of the same phase are connected together. And, the insulation sheet is provided between the stator core and each of the base plates. Therefore, the insulation of the plural coil bars, the plural connection coils and the stator core can be ensured.

Since the plural coil bar 25 to be inserted in each slot 23 in the stator core 21 is made integral by the insulation material 28, the handling properties are improved so that the plural coil bars 25 can easily be inserted in the slot 23.

When the coil bars 25 covered by the insulation material 28 is press fitted in each of the slots 23 in the stator core 21, the coil bars 25 can be surely fixed in the slot 23 in the stator core 21 easily.

The connection coils 40 are made up of the inner connection coils 42 and the outer connection coils 41 which are disposed in the different axial positions, and the plural grooves 37, 38 are formed on the facing outer surfaces 35 and inner surfaces 36 of the base plates 31L, 31R. The outer connection coils 41 are disposed in the outer surface grooves 37 formed on the outer surfaces 35, while the inner connection coils 42 are disposed in the inner surface grooves 38 formed on the inner surfaces 36. Therefore, the insulation of the outer connection coils 41 and the inner connection coils 42 is ensured by the base plates 31L, 31R.

The invention is not limited to the above-described embodiment and can be changed as required. For example, although 12 connecting terminal joining holes 39 are formed in the embodiment, for example, a configuration in which six connecting terminal joining holes 39 are formed and adjacent connection coils of the same phase are connected together may be adopted. An insulation cover may be disposed at the axially outer ends of the pair of base plate assemblies 30L, 30R. Alternatively, the axially outer ends may be coated with a resin or the like.

Figure 15:
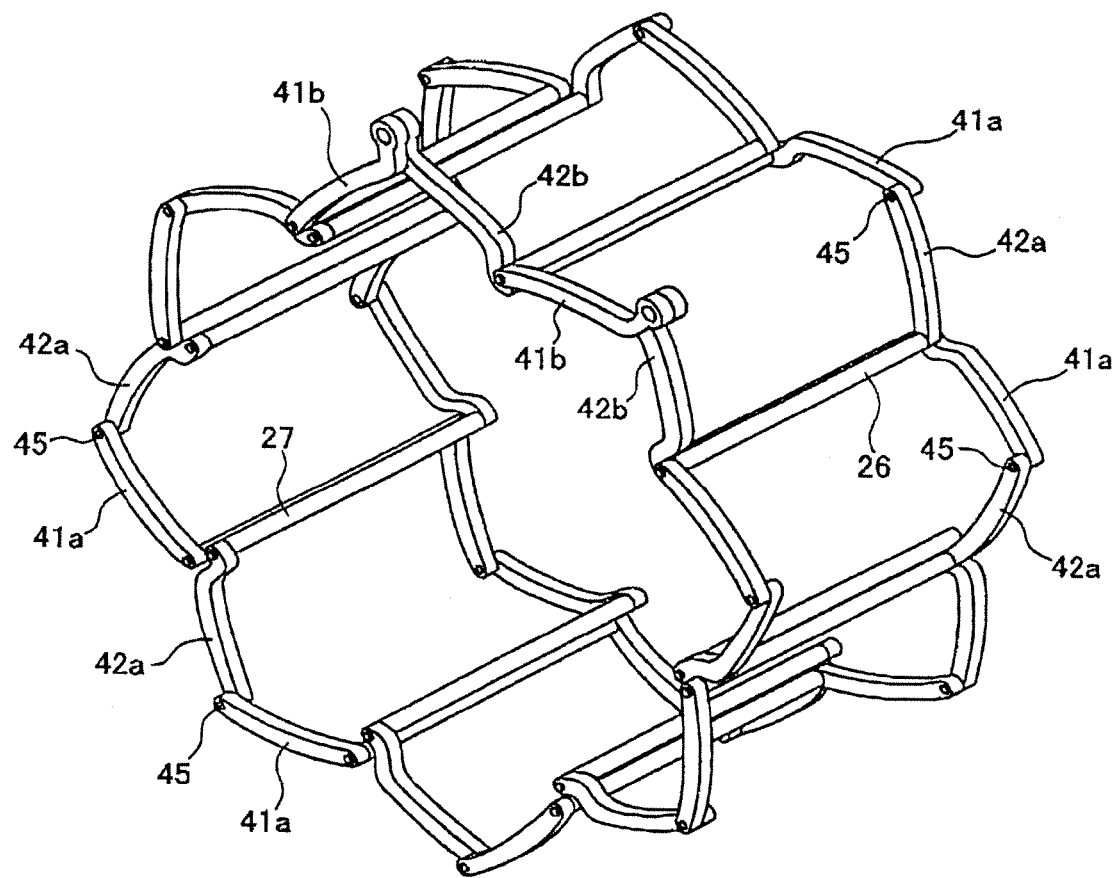
FIG. 15 perspectively shows coils of one phase making up single-slot type coils of plural phases.
Figure 16:
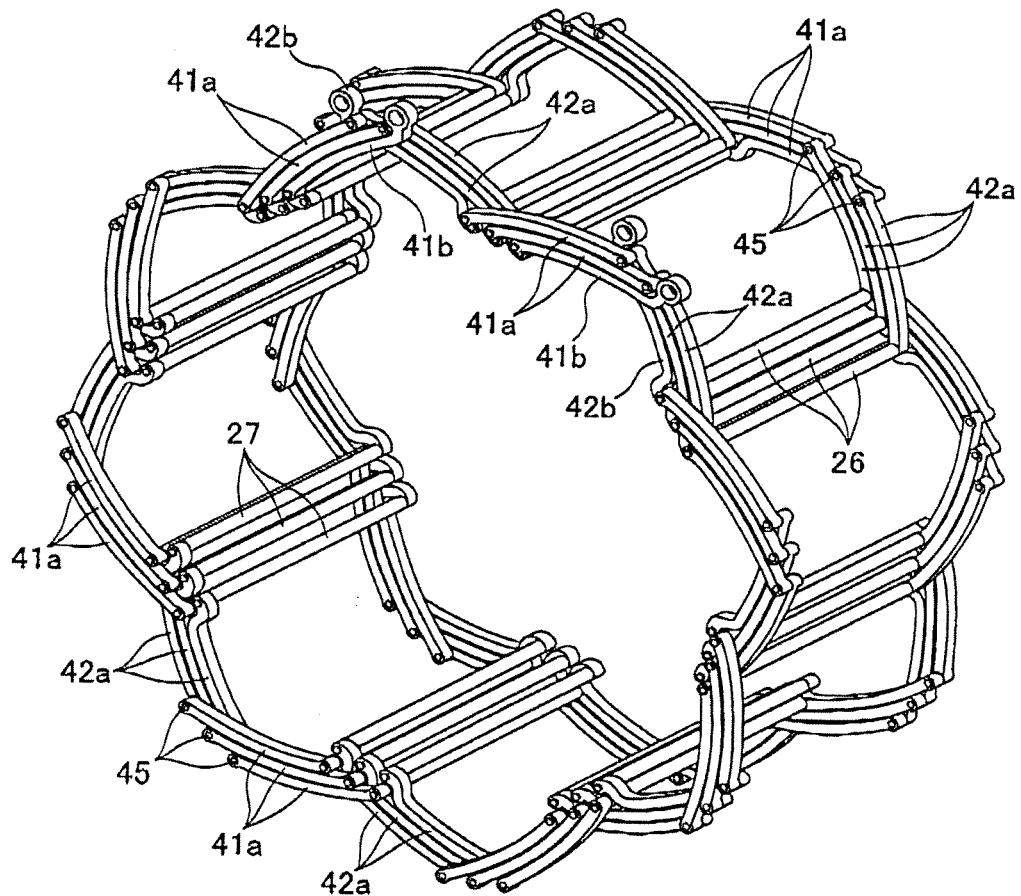
FIG. 16 perspectively shows coils of one phase making up triple-slot type coils of plural phases.

The stator 10 of the invention is not limited to the double-slot type stator. For example, the stator 10 can be configured as a single-slot type stator of which coils of one phase have the shape as shown in FIG. 15 or as a triple-slot type stator of which coils of one phase have the shape as shown in FIG. 16. In a three-phase, eight-pole, wave wound stator, in the case of the single-slot type stator, the number of slots in the stator core 21 is 24, and in the case of the triple-slot type stator, the number of slots in the stator core 21 is 72. The stator of either type may have the same construction as that of the double-slot type stator 10.

The invention claimed is:

1. A stator for an electric rotary machine, the stator including:
   a stator core having plural slots;
   segmented coils of plural phases;
   a pair of base plates provided at both ends of the stator core; and
   insulation material,
   wherein the segmented coils have
      plural substantially-straight coil bars which are respectively inserted in the slots in the stator core, and
      plural connection coils which are disposed on the base plates so as to connect together the coil bars of the same phase to thereby make up spanning portions of the segmented coils,
   wherein the base plates are made of a non-magnetic material, and include plural grooves that are formed on surfaces of the base plates facing axial end faces of the stator core,
   wherein the coil bars are respectively disposed in the slots in the stator core, and each of the coil bars have a radially outer coil bar and a radially inner coil bar,
   wherein the insulation material comprises the radially outer coil bar and the radially inner coil bar, wherein the radially outer coil bar and the radially inner coil bar are integrally covered by the insulation material, and wherein the insulation material is interposed between the radially outer coil and the radially inner coil bar,
   wherein the connection coils are disposed in the plural grooves formed on the surfaces of the base plates so that the connection coils of the same phase are connected together while the connection coils of the different phases are insulated from each other,
   wherein insulation sheets are provided between the axial end faces of the stator core and the surfaces of the base plates,
   wherein each of the insulation sheets define a plurality of holes which are penetrated by the coil bars,
   wherein the stator core and the coil bars make up a stator core assembly and the base plates and the connection coils make up base plate assemblies, so that the stator is made up of the stator core assembly and the base plate assemblies which are disposed at both ends of the stator core assembly, and
   wherein the radially outer coil bar and the radially inner coil bar of each of the coil bars are configured to connect the base plate assemblies disposed at both ends of the stator core assembly to the stator core assembly.

2. The stator of claim 1, wherein the coil bars and the connection coils are connected together by being press fitted or crimped together at both end portions thereof.

3. The stator of claim 1, wherein the coil bars and the connection coils are connected together by being press fitted and crimped together at both end portions thereof.

4. The stator of claim 3, wherein tapered portions are formed at both end portions of each coil bar, and tapered holes adapted to be fitted on the tapered portions are formed in the connection coils, and
   wherein the coil bars and the connection coils are respectively joined to each other simultaneously by press fitting the tapered portions in the tapered holes and thereafter crimping distal ends of the tapered portions by crushing them to be deformed.

5. The stator of claim 1, wherein the connection coils are disposed to at least partially in a region where the stator core is projected in an axial direction.

6. The stator of claim 1, wherein the spanning portions are at least partially exposed to axial end faces and are formed flush with the axial end faces, and
   wherein a cooling plate is provided on an outer side of at least one of the base plates so as to be in surface contact with the exposed spanning portions directly or indirectly.

7. The stator of claim 6, wherein the radially outer coil bar and the radially inner coil bar are aligned in a radial direction,
   wherein the connection coils each includes an inner connection coil and an outer connection coil which are disposed in different axial positions,
   wherein the plural grooves are formed on an outer surface and an inner surface of each of the base plates, and the plural grooves on the outer surface and on the inner surface are opposite from each other,
   wherein the outer connection coils are disposed in the grooves which are formed on the outer surfaces and the inner connection coils are disposed in the grooves which are formed on the inner surfaces, and
   wherein one of the radially outer coil bar and the radially inner coil bar is connected to the outer connection coil at one end and is connected to the inner connection coil at the other end, and the other of the radially outer coil bar and the radially inner coil bar is connected to the inner connection coil at one end and is connected to the outer connection coil at the other end.

8. The stator of claim 1, wherein the coil bars to be respectively inserted in the slots are each made integral by the insulation material.

9. The stator of claim 1, wherein the coil bars covered by the insulation material are press fitted in the slots, respectively.

10. The stator of claim 1, wherein the connection coils each includes an inner connection coil and an outer connection coil which are disposed in different axial positions,
   wherein the grooves are formed on an outer surface and an inner surface of each base plate which are opposite from each other, and wherein the outer connection coils are disposed in the grooves formed on the outer surface, while the inner connection coils are disposed in the grooves formed on the inner surface.

11. A fabrication method of a stator for an electric rotary machine, the stator including:
a stator core having plural slots;
segmented coils of plural phases;
a pair of base plates which are provided at both ends of the stator core; and
insulation material,
wherein the segmented coils have
plural substantially-straight coil bars which are respectively inserted in the slots in the stator core, and
plural connection coils which are disposed on the base plates so as to connect together the coil bars of the same phase to thereby make up spanning portions of the segmented coils,
the fabrication method including:
forming a stator core assembly by respectively inserting the coil bars in the slots in the stator core;
forming base plate assemblies by disposing the connection coils on the base plates; and
assembling the base plate assemblies to both axial ends of the stator core assembly,
wherein the base plates are made of a non-magnetic material, and include plural grooves that are formed on surfaces of the base plates facing axial end faces of the stator core,
wherein the coil bars are respectively disposed in the slots in the stator core, and each of the coil bars have a radially outer coil bar and a radially inner coil bar,
wherein the insulation material comprises the radially outer coil bar and the radially inner coil bar, wherein the radially outer coil bar and the radially inner coil bar are integrally covered by the insulation material, and wherein the insulation material is interposed between the radially outer coil and the radially inner coil bar,
wherein the connection coils are disposed in the plural grooves formed on the surfaces of the base plates so that the connection coils of the same phase are connected together while the connection coils of the different phases are insulated from each other,
wherein insulation sheets are provided between the axial end faces of the stator core and the surfaces of the base plates,
wherein each of the insulation sheets define a plurality of holes which are penetrated by the coil bars, and
wherein the radially outer coil bar and the radially inner coil bar of each of the coil bars are configured to connect the base plate assemblies assembled to both axial ends of the stator core assembly to the stator core assembly.

12. The method of claim 11, wherein, in the assembling step, the coil bars and the connection coils are connected together by being press fitted or crimped together at both end portions thereof.

13. The method of claim 11, wherein, in the assembling step, the coil bars and the connection coils are connected together by being press fitted and crimped together at both end portions thereof.

14. The method of claim 13, wherein tapered portions are formed at both end portions of each coil bar, and tapered holes adapted to be fitted on the tapered portions are formed in the connection coils, and
wherein, in the assembling step, the coil bars and the connection coils are respectively joined to each other simultaneously by press fitting the tapered portions in the tapered holes and thereafter crimping distal ends of the tapered portions by crushing them to be deformed.

15. A stator for an electric rotary machine, the stator including:
a stator core having plural slots;
segmented coils of plural phases;
a base plate provided at an end of the stator core; and
insulation material,
wherein the segmented coils have
plural substantially-straight coil bars which are respectively inserted in the slots in the stator core, and
plural connection coils which are disposed on the base plate so as to connect together the coil bars of the same phase to thereby make up spanning portions of the segmented coils,
wherein the base plate is made of a non-magnetic material, and include plural grooves that are formed on surfaces of the base plate facing axial end faces of the stator core,
wherein the coil bars, which are respectively disposed in the slots in the stator core, and each of the coil bars have a radially outer coil bar and a radially inner coil bar,
wherein the insulation material comprises the radially outer coil bar and the radially inner coil bar, wherein the radially outer coil bar and the radially inner coil bar are integrally covered by the insulation material, and wherein the insulation material is interposed between the radially outer coil and the radially inner coil bar,
wherein the connection coils are disposed in the plural grooves which are formed on the surfaces of the base plate so that the connection coils of the same phase are connected together while the connection coils of the different phases are insulated from each other,
wherein insulation sheets are provided between the axial end faces of the stator core and the surfaces of the base plate,
wherein each of the insulation sheets define a plurality of holes which are penetrated by the coil bars,
wherein the stator core and the coil bars make up a stator core assembly and the base plate and the connection coils make up a base plate assembly, so that the stator is made up of the stator core assembly and the base plate assembly which is disposed at an end of the stator core assembly, and
wherein the radially outer coil bar and the radially inner coil bar of each of the coil bars are configured to connect the base plate assembly disposed at the end of the stator core assembly to the stator core assembly.

* * * * *